(12) United States Patent
Wellbrock et al.

(10) Patent No.: US 8,280,208 B2
(45) Date of Patent: Oct. 2, 2012

(54) OPTICAL FIBER CONNECTOR AND NETWORK DEVICE CONFIGURATION

(75) Inventors: Glenn A. Wellbrock, Wylie, TX (US); Tiejun J. Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 277 days.

(21) Appl. No.: 12/637,234

(22) Filed: Dec. 14, 2009

(65) Prior Publication Data

US 2011/0142441 A1   Jun. 16, 2011

(51) Int. Cl.
*G02B 6/26* (2006.01)

(52) U.S. Cl. ............................................. 385/52; 385/25

(58) Field of Classification Search ...................... 385/52
See application file for complete search history.

(56) References Cited

U.S. PATENT DOCUMENTS

| | | | | |
|---|---|---|---|---|
| 4,452,506 | A * | 6/1984 | Reeve et al. | 385/52 |
| 4,474,423 | A * | 10/1984 | Bisbee et al. | 385/52 |
| 5,177,348 | A * | 1/1993 | Laor | 250/201.1 |
| 5,216,729 | A * | 6/1993 | Berger et al. | 385/31 |
| 6,102,582 | A * | 8/2000 | Espindola et al. | 385/57 |
| 6,381,382 | B2 * | 4/2002 | Goodman et al. | 385/22 |
| 6,633,708 | B1 * | 10/2003 | Lim | 385/52 |
| 6,941,034 | B2 * | 9/2005 | Kuboi | 385/17 |
| 7,190,862 | B1 * | 3/2007 | Peterson | 385/41 |
| 7,342,887 | B1 | 3/2008 | Sindhu et al. | |
| 7,477,595 | B2 | 1/2009 | Saito | |
| 7,552,262 | B1 | 6/2009 | Turner et al. | |
| 2002/0181844 | A1 * | 12/2002 | Vaganov | 385/17 |
| 2003/0063838 | A1 * | 4/2003 | Hagood et al. | 385/16 |
| 2004/0013347 | A1 * | 1/2004 | Kuboi | 385/17 |
| 2005/0175296 | A1 * | 8/2005 | Massey | 385/90 |
| 2008/0044181 | A1 | 2/2008 | Sindhu | |

* cited by examiner

*Primary Examiner* — Sung Pak

(57) ABSTRACT

A fiber-optic coupler may include a first optical fiber including an end portion to send or receive optical signals to or from an end portion of a second optical fiber. The coupler may also include a micro-electromechanical systems (MEMS) structure to align the end portion of the first optical fiber with the end portion of the second optical fiber.

25 Claims, 19 Drawing Sheets

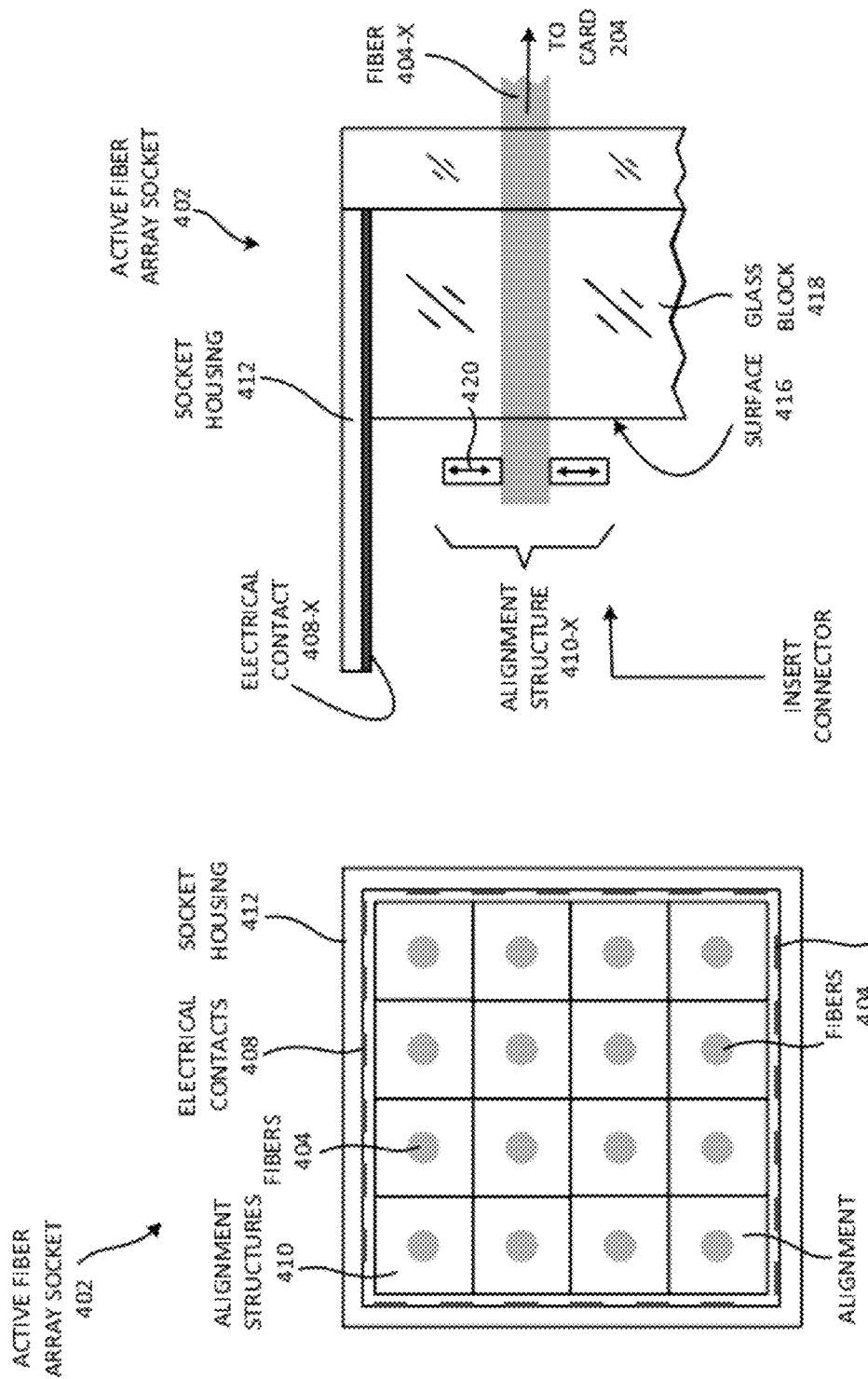

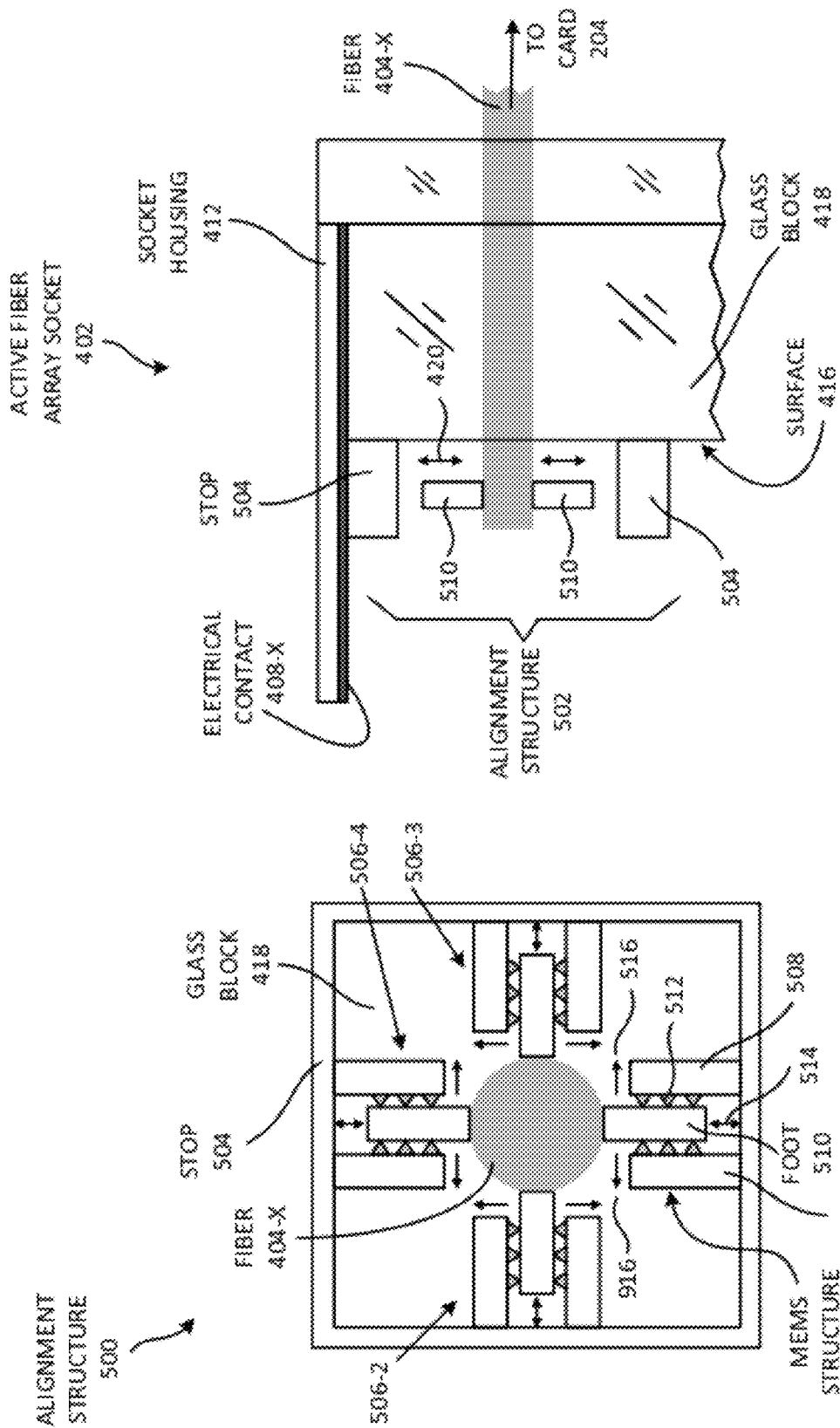

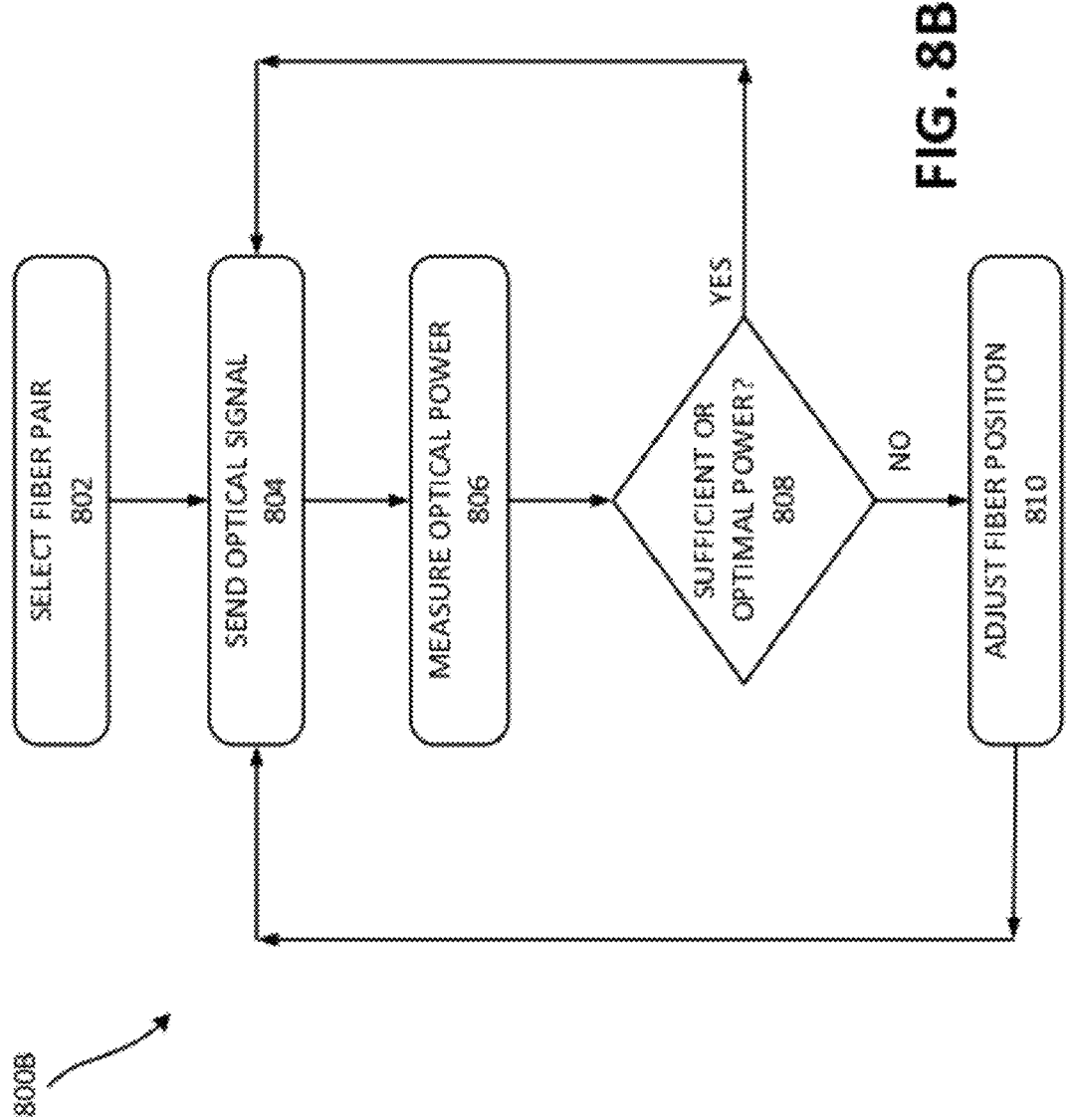

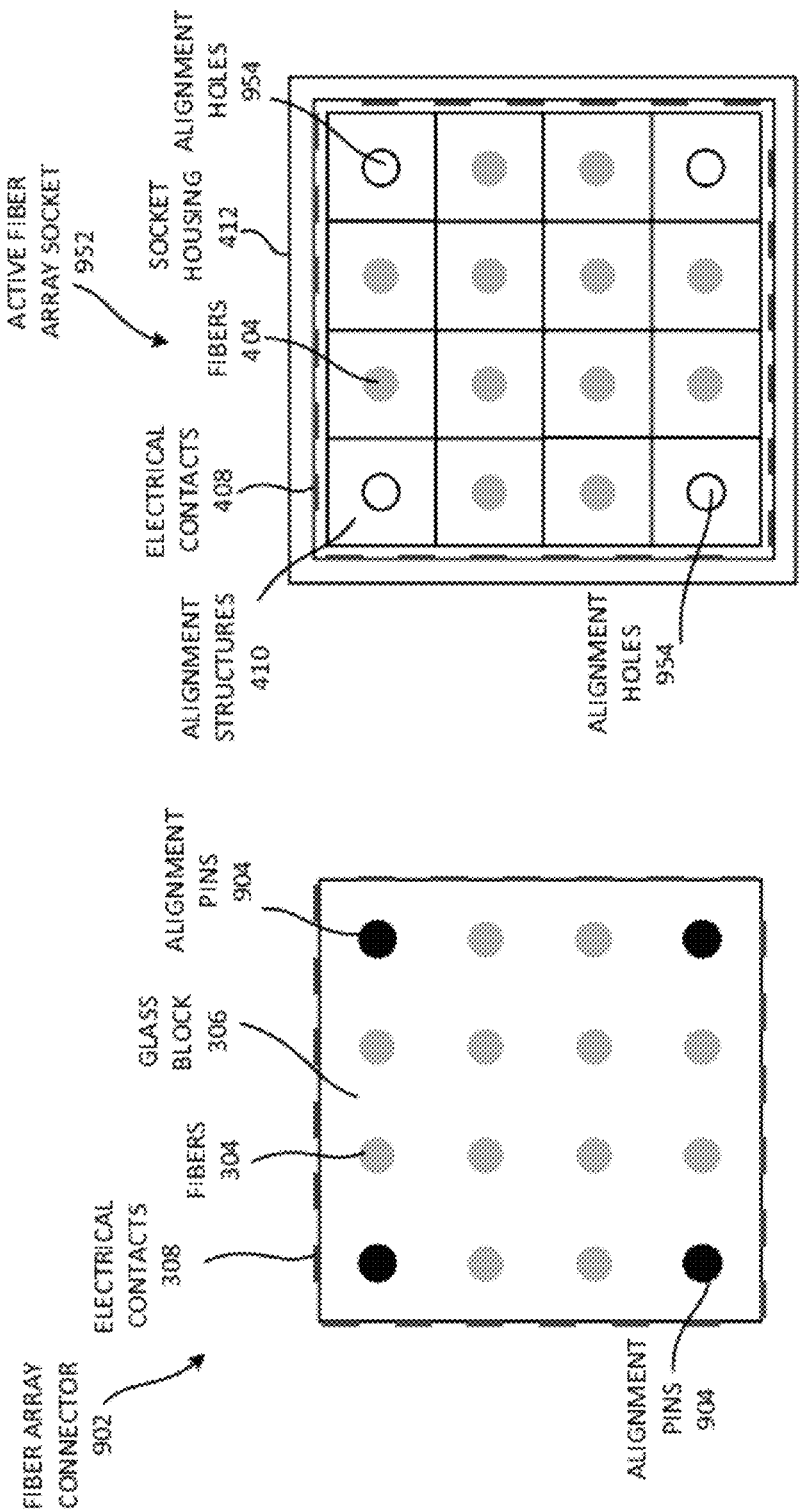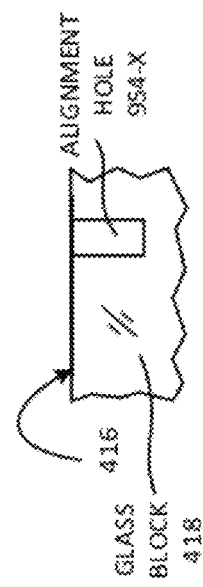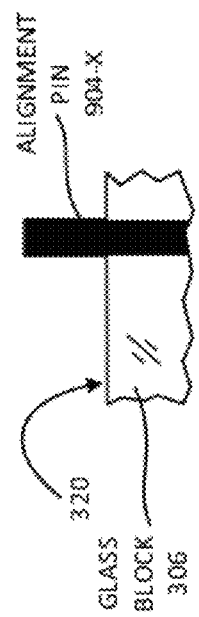

OPTICAL FIBER CONNECTOR AND NETWORK DEVICE CONFIGURATION

BACKGROUND INFORMATION

Businesses and individuals increasingly rely on computer networks for communications. For example, home users expect to receive television programming on-demand over digital networks. Businesses may rely on applications (e.g., database applications, mail server applications, word processing applications, etc.) provided over a network, such as the public Internet or a leased private network. As time passes, communication networks are expected to carry more data through some of the same communication paths in a more reliable manner.

BRIEF DESCRIPTION OF THE DRAWINGS

FIGS. 4A and 4B are illustrations of an exemplary active fiber-array socket;

FIG. 5 is an illustration an exemplary alignment structure in one embodiment;

FIG. 6 is an illustration of a cross section of a portion of the active fiber array socket of FIG. 4 including the alignment structure of FIG. 5;

FIGS. 8A and 8B are flowcharts of an exemplary processes for aligning fibers in an active fiber-array socket;

FIG. 9A is a block diagram of an exemplary fiber array connector in another embodiment;

FIG. 9B is a block diagram of an exemplary active fiber-array socket in another embodiment;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1A:
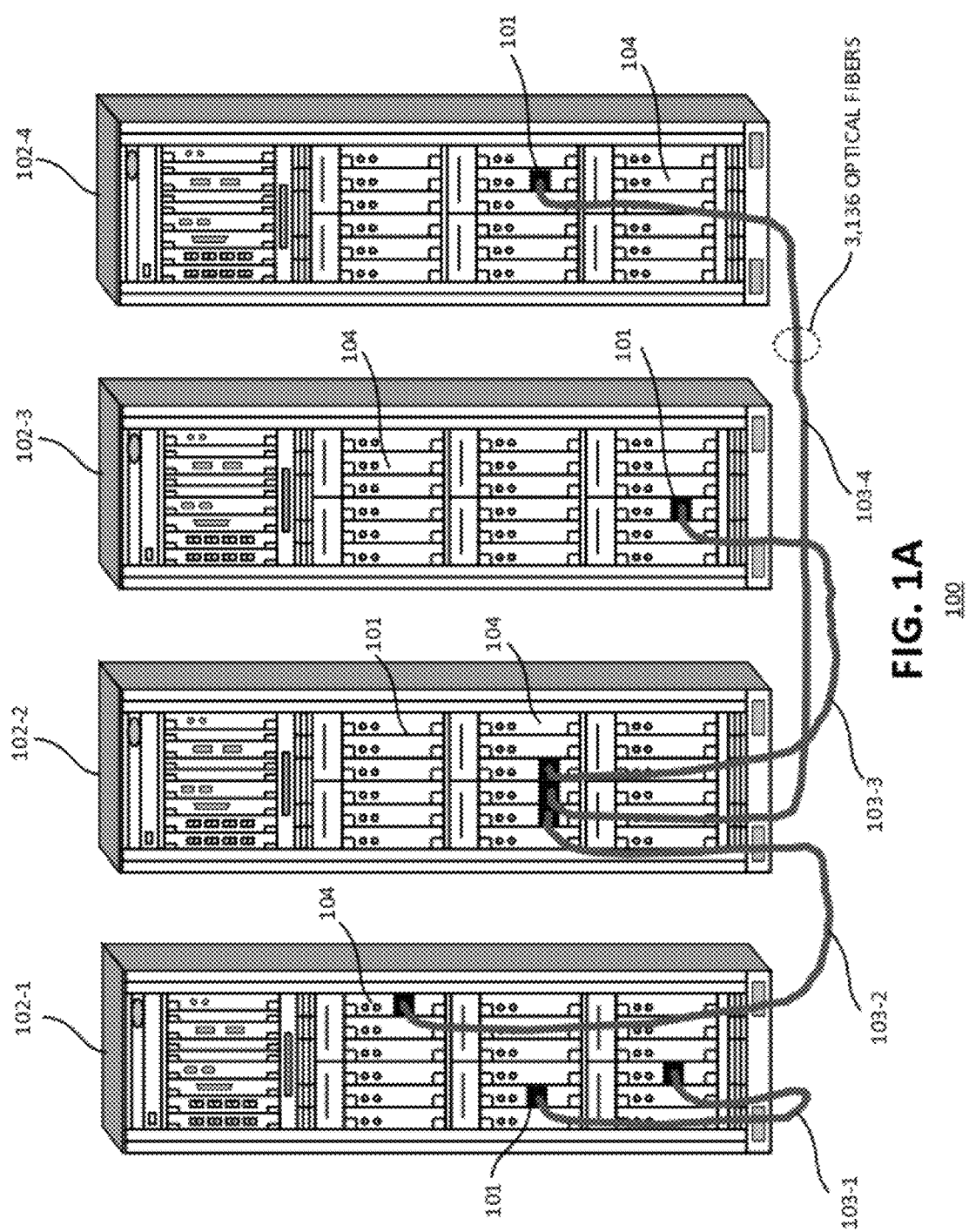
FIG. 1A is a diagram of an overview of an exemplary network configuration described herein.

FIG. 1A is a diagram of an overview of an exemplary network 100 described herein. Network 100 may include four network devices 102-1 through 102-4 (collectively, "network devices 102"). Network devices 102 may each include a chassis for receiving equipment cards 104, such as a line card for a router, switch, or switch fabric, for example. Embodiments disclosed herein allow for an optical fiber connector (or "coupler") 101 for connecting equipment cards 104 and/or network devices 102 with cables 103. In one or more embodiments, connector 101 and cable 103 may include hundreds if not thousands of optical fibers. In one or more embodiments, connector 101 may include MEMS (Micro-Electromechanical Systems) structures for aligning the optical fibers. In one embodiment, connector 101 may reduce or the size of eliminate the need for a "backplane" for passing data between equipment cards and/or network devices. This embodiment may save power and/or increase data throughput. This embodiment may also be referred to as providing an "optical frontplane" with connectors 101 and cables 103, as an operator may be able to reach connectors 101 without having to go behind network devices 102.

In the example of FIG. 1A, network device 102-2 may provide a switch fabric, or part of a switch fabric (e.g., a second stage of a Clos switch fabric), for the other network devices 102-1, 102-3, and 102-4. As shown in this example, cable 103-2 may connect network devices 102-1 and 102-2; cable 103-3 may connect network devices 102-3 and 102-2; and cable 103-4 may connect network devices 102-4 and 102-2. Cable 103-1 connects two equipment cards 104 within network device 102-1.

Figure 1B:
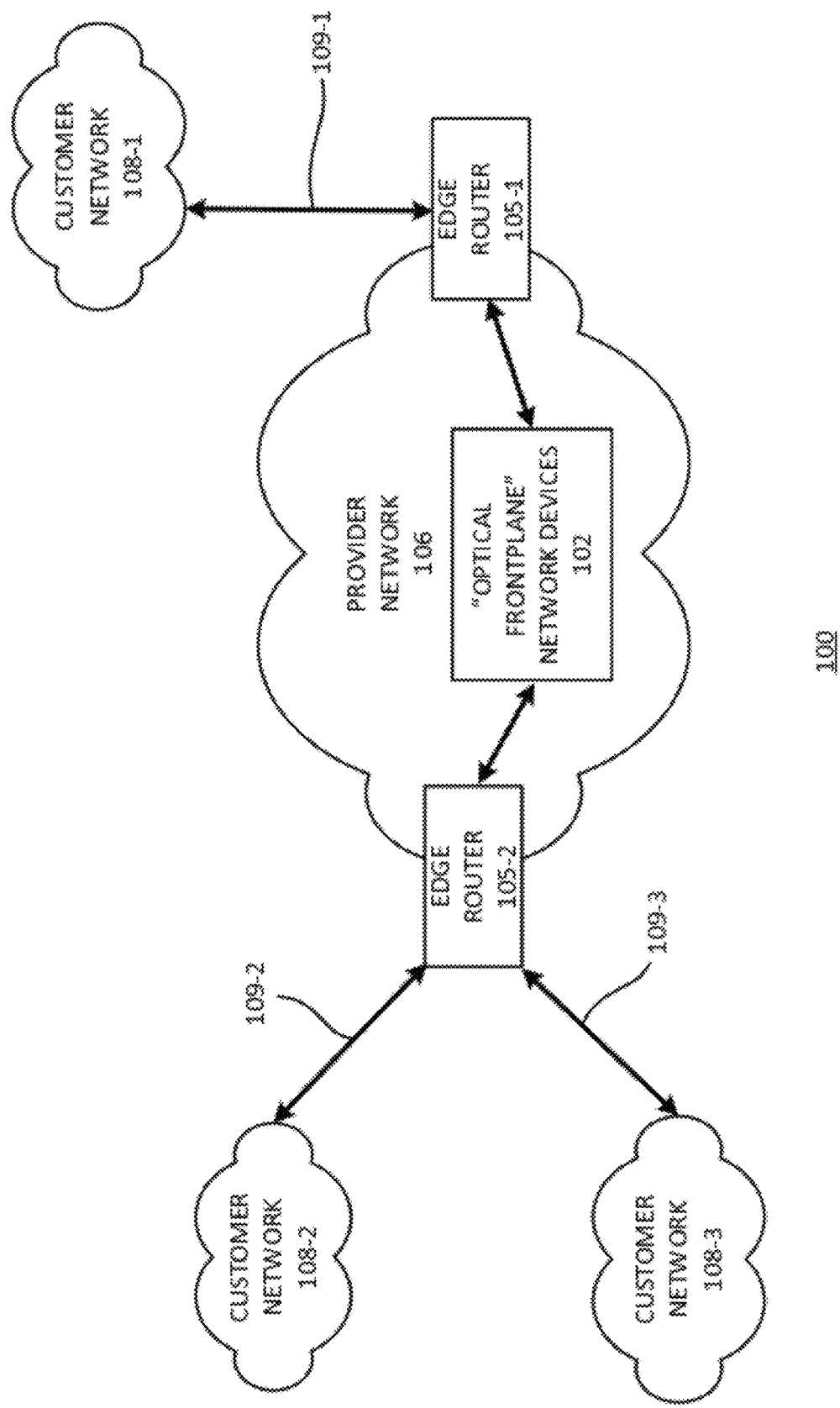
FIG. 1B is a block diagram of an exemplary network environment in which embodiments disclosed herein may be implemented.

FIG. 1B is a block diagram of an exemplary network environment 100 in which embodiments disclosed herein may be implemented. Network environment 100 may include a provider network 106, which may include optical-frontplane network devices 102 (shown in FIG. 1A) and edge routers 105-1 and 105-2 (collectively "edge routers 105," individually "edge routers 105-x"). Optical-frontplane network device 102 may be referred to as "network device 102."

As shown, edge router 105-1 is coupled to customer network 108-1 via access link 109-1, and edge router 105-2 is coupled to customer networks 108-2 and 108-3 via access links 109-2 and 109-3, respectively. Customer networks 108 may be networks for geographically separated sites of an enterprise, for example. Customer networks 108 may include one or more computing devices (not shown), such as personal computers, laptop computers, handheld computers, workstations, servers, switches, printers, customer data centers or other devices.

Network device 102 may communicate with edge routers 105 to provide customer networks 108 (individually, "customer networks 108-1, 108-2, and 108-3") with access to each other (e.g., through provider network 106). Provider network 106 may be coupled to one or more networks that may form part of a public-network infrastructure, e.g., the Internet. Provider network 106 may allow the computing devices (not shown) within disparate customer networks 108 to access the Internet and to communicate with each other. Network device 102 may exchange routing information with edge routers 105 to maintain an accurate representation of the topology of network environment 100.

Network device 102 may include components (e.g., routing or switching components) such that network device 102 may operate as a single node within provider network 106 while occupying multiple chassis.

Provider network 106 and/or customer networks 108 ("networks 106/108") may include a packet-switched, private Internet Protocol (IP) network. Networks 106/108 may also employ the Ethernet Protocol, Synchronous Optical Networking (SONET), Asynchronous Transfer Mode (ATM), Multi-Protocol Label Switching (MPLS), etc. Networks 106/108 may include a local area network (LAN), a wide area network (WAN), a virtual private network (VPN), a metropolitan area network (MAN), a high-speed fiber optic network (e.g., FiOS™), a mesh network, the Internet, an intranet, or any other network or combinations of networks. Networks 106/108 may include wired and/or wireless data networks. Networks 106/108 may also include one or more circuit-switched networks, such as a Public-Switched Telephone Network (PSTN).

The exemplary configuration of devices in network environment 100 is illustrated for simplicity. Network environment 100 may include more devices, fewer devices, or a different configuration of devices than illustrated in FIG. 1B. For example, provider network 106 may include a many network devices (not shown), other than multi-chassis network device 102 and edge routers 105, such as additional routers, switches, servers, etc.

Network device 102 may include multiple equipment cards, chassis, fabrics, or devices (not shown in FIG. 1B) that are physically coupled and configured with an actively-aligned fiber connection. Such an actively-aligned fiber connection may form an "optical frontplane," which use optical fibers for connecting equipment cards and/or network devices.

Figure 2:
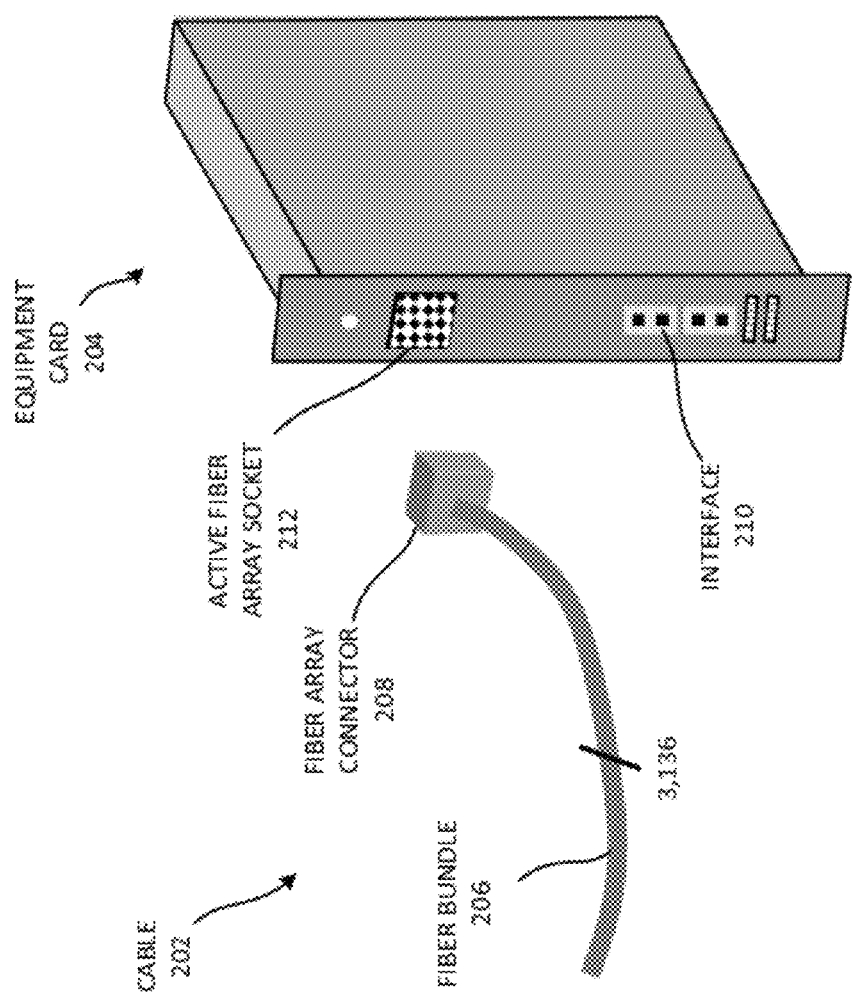
FIG. 2 is an illustration of an exemplary cable and an exemplary equipment card in one embodiment.

FIG. 2 is an illustration of an exemplary cable 202 and an exemplary equipment card 204. Card 204 may be a line card for a router chassis, a switch card for a switch chassis, or any other type of network equipment. Cable 202 may include a fiber bundle 206 and a fiber array connector 208 at the end of fiber bundle 206. Fiber bundle 206 may include more than one optical fiber, e.g., bundle 206 may include anywhere between 5, 10, 25, 50, 100, 500, 1000, 1,500, 2,000, 3,000, 4,000, 5,000, 10,000, or more optical fibers. All or some of the optical fibers may end at (e.g., be exposed in) connector 208 for connecting to another network device, such as card 204.

Card 204 may include an interface 210 and an active fiber array socket 212. Interface 204 may provide a physical interface for receiving and sending data (e.g., packets) to an external node. For example, interface 204 may include a fiber optic port for receiving a fiber optic cable, an Ethernet port for receiving an Ethernet cable, etc. Active fiber-array socket 212 may receive fiber array connector 208. Socket 212 may also include fiber optic cables in the same number, in one embodiment, as the number of fiber optic cables in fiber bundle 206. Active fiber-array socket 212 may, in one embodiment, adjust fibers in socket 212 so as to align the fibers with the corresponding fibers in connector 208. In this embodiment, optical communications from the fibers in cable 202 may pass to the fibers in socket 212 and into card 204. In the embodiment of FIG. 2, fiber bundle 206 includes 3,136 (e.g., 56×56) optical fibers and socket 212 also includes 3,136 optical fibers for receiving communications from each of the fibers in bundle 206.

In one embodiment, cable 202 may also include wires, as well as optical fibers, for carrying electrical communication signals and/or power. In this embodiment, the wires may also end in connector 208 (e.g., as electrical contacts) for connecting to the other network device, such as card 204. Further, socket 212 may include electrical contacts in the same number, in one embodiment, as the number of wires in cable 202. The contacts in socket 212 may mate with the contacts in connector 208 so that communications and/or power, for example, may pass from cable 202 into card 204.

Figure 3B:
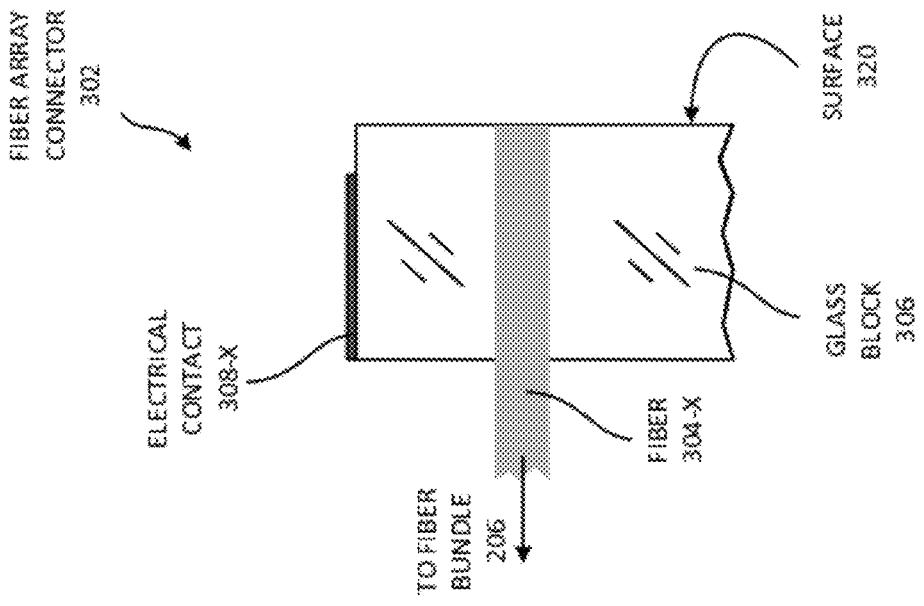
FIGS. 3A and 3B are illustrations of an exemplary fiber array connector.
Figure 3A:
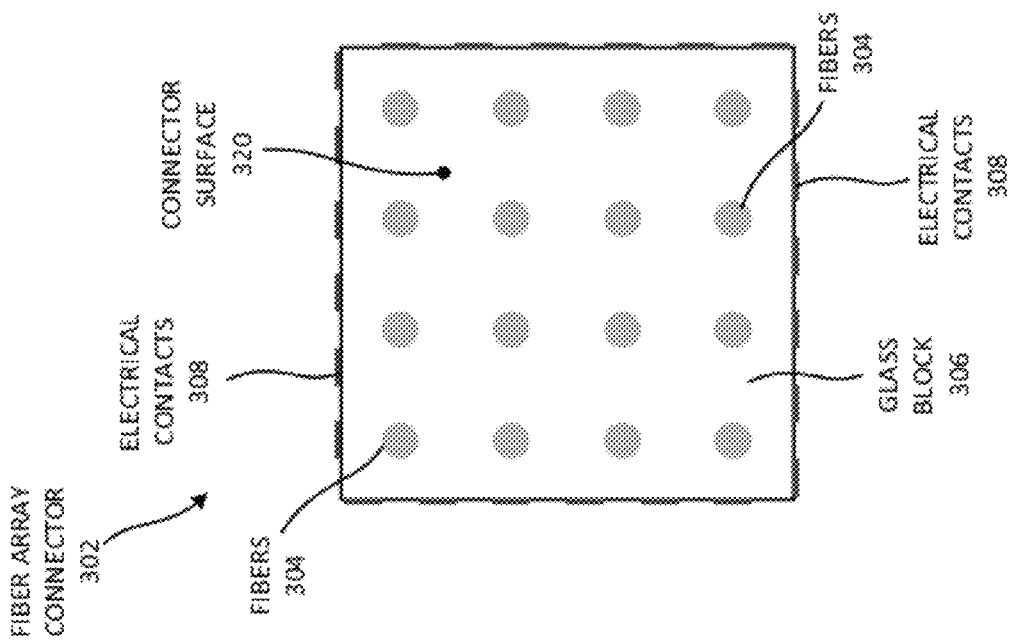

FIGS. 3A and 3B are illustrations of an exemplary fiber array connector 302. FIG. 3A is a view of connector 302 from the end. FIG. 3B shows a cross section of a portion of connector 302. Connector 302 may include fibers 304, a glass block 306, electrical contacts 308. Fiber array connector 208 of FIG. 2 may be arranged similarly, but scaled so as to include additional fibers (e.g, 3,136 fibers).

Fibers 304 (individually fiber 304-$x$) may form an array, such as a square array shown in FIG. 3A. Glass block 306 may retain fibers 304, e.g., fibers 304 may be mounted in and pass through glass block 306. In the embodiment of FIG. 3A, connector 302 includes 16 fibers. As discussed above with respect to connector 208, fewer or many more fibers are possible. For example, connector 302 may include 3,136 optical fibers (e.g., a 56×56 array).

Electrical contacts 308 (individually, "contact 308-$x$") may be mounted on the surface of glass block 306. In the embodiment of FIG. 3A, contacts 308 may be equally spaced around glass block 306 and may be equal in number on each side of glass block 306. As shown in FIG. 3B, in one embodiment, electrical contact 308-$x$ may not extend to surface 320 of glass block 306. In the embodiment of FIG. 3A, connector 302 includes 24 electrical contacts 308. Fewer or more electrical contacts 308 are possible. For example, connector 302 may include hundreds or thousands of electrical contacts 308.

As shown in FIG. 3B, the end of fiber 304-$x$ may be substantially in the same plane as a surface 320 of glass block 306. The configuration of this embodiment may allow for easy cleaning of the end surface of fibers 304 of connector 302. Clean fibers 304 may reduce degradation of optical signals passing through fibers 304.

FIGS. 4A and 4B are illustrations of an exemplary active fiber-array socket 402. FIG. 4B shows a cross section of a portion of active fiber-array socket 402. Socket 402 may include fibers 404 (individually, "fiber 404-$x$"), a glass block 418, electrical contacts 408 (individually, "electrical contact 408-$x$"), alignment structures 410 (individually, "alignment structure 410-$x$"), and a socket housing 412. Active fiber-array socket 212 of FIG. 2 may be arranged similarly, but scaled so as to include additional fibers (e.g., 3,136 fibers).

Fibers 404 may include the same number of fibers found in connector 302, which socket 402 may receive. Fibers 404 may be arranged in substantially the same arrangement as fibers 304 in connector 302. For example, fibers 404 may form an array, such as a square array shown in FIG. 4A. A glass block 418 and alignment structures 410 may retain fibers 404, e.g., fibers 404 may be mounted in and pass through glass block 418 and fibers 404 may also be movably held by alignment structures 410. As shown in FIG. 4B, fiber 404-$x$ may extend, in one embodiment, beyond a surface 416 of a glass block 418. In this embodiment, alignment structure 410-$x$ may move fiber 404-$x$ in directions perpendicular to the axis of fiber 404-$x$ (e.g., in the directions of double-headed arrow 420). In the embodiment of FIG. 4A, socket 402 includes 16 fibers. As discussed above with respect to socket 212, fewer or many more fibers are possible. For example, socket 402 may include 3,136 optical fibers (e.g., a 56×56 array).

Electrical contacts 408 may align with electrical contacts 308 of connector 302. In this case, electrical communication signals may pass from connector 302 to socket 402 when connector is plugged into socket 402. Electrical contacts 408 may include the same number of electrical contacts found in connector 302, which socket 402 receives. Electrical contacts 408 may be arranged in substantially the same arrangement as electrical contacts 308 in connector 302. For example, electrical contacts 408 may be mounted around the inside of socket housing 412. In the embodiment of FIG. 4A, contacts 408 may be equally spaced around the inside of socket housing 412 and may be equal in number on each side of socket housing 412. In the embodiment of FIG. 4A, socket 402 includes 24 electrical contacts 408. Fewer or more electrical contacts 408 are possible. For example, socket 402 may include hundreds or thousands of electrical contacts 408.

As mentioned, socket housing 412 may retain electrical contacts 408, which may be formed on the inside of socket housing 412. Socket housing 412 may also receive glass block 306 of connector 302. In one embodiment, socket housing 412 may act as one measure to align fibers 304 of connector 302 with fibers 404 of socket 402.

In one embodiment, socket housing 412 may not align fibers 304 with fibers 404 sufficiently. In this case, alignment structures 410 may, in one embodiment, adjust fibers 404 so as to align fibers 404 with corresponding fibers 304 in connector 302. In one embodiment, each fiber 404-x may be paired with an alignment structure 410-x so that each fiber 404-x may be adjusted individually. In this embodiment, optical signals from each of fibers 304 may pass to a corresponding one of fibers 404 when connector 302 is plugged into socket 402.

FIG. 5 is a block diagram of an exemplary alignment structure 502 in one embodiment. In one embodiment, alignment structure 410-x discussed above may take the form of structure 502. Alignment structure may include fiber 404-x, glass block 418, a stop 504, and four MEMS (Micro-Electromechanical Systems) structures 506. FIG. 6 shows a cross section of alignment structure 502. In the embodiment of FIGS. 5 and 6, fiber 404-x extends above the surface of glass block 418 where it engages a number of MEMS structures 506 (e.g., four MEMS structures 506-1 through 506-4).

MEMS structure 506-1 may include two legs 508 and a foot 510. MEMS structures 506-2, 506-2, and 506-4 may function and be configured similarly. Foot 510 may engage the side of fiber 404-x. Together, the feet of MEMS structures 506 may engage fiber 404-x in four locations. Legs 508 may include teeth 512 that, in one embodiment, may move foot 510 toward or away from the central axis of fiber 404-x (e.g., in the directions of double-headed arrow 514), or from side to side parallel to a tangential surface of fiber 404-x (e.g., in the directions of arrows 516). When connector 302 is coupled to socket 402, MEMS structures 506 may adjust fiber 404-x in socket 402 to align with the corresponding fiber 304-x in connector 302. In one embodiment, foot 510 is voltage controlled. For ease of illustration, legs 508 are not shown in FIG. 6. In one embodiment, once fiber 404-x in socket is properly aligned, it may be "locked" in place by, for example, removing the control voltage.

Stop 504 may support MEMS structures 506 around fiber 404-x. In one embodiment, stop 508 may also act to stop the forward motion of a connector (described in more detail with respect to FIG. 7) so as to keep an appropriate gap between fiber 404-x of socket 402 and fiber 304-x of connector 302.

In one embodiment, (1) fiber 404-x may be approximately 125 micrometers in diameter; (2) fiber 404-x may be manufactured and mounted in glass block 418 with a position accuracy of approximately 5 to 10 micrometers; (3) the position accuracy requirement of fiber 404-x may be less than 0.5 micrometers; (4) alignment structure 410-x may move fiber 404-x approximately +/−10 micrometers in any direction; (5) the size of alignment structure 410-x may be approximately 450 square micrometers; and (6) the approximate number of alignment structures per inch is 3,200.

Figure 7A:
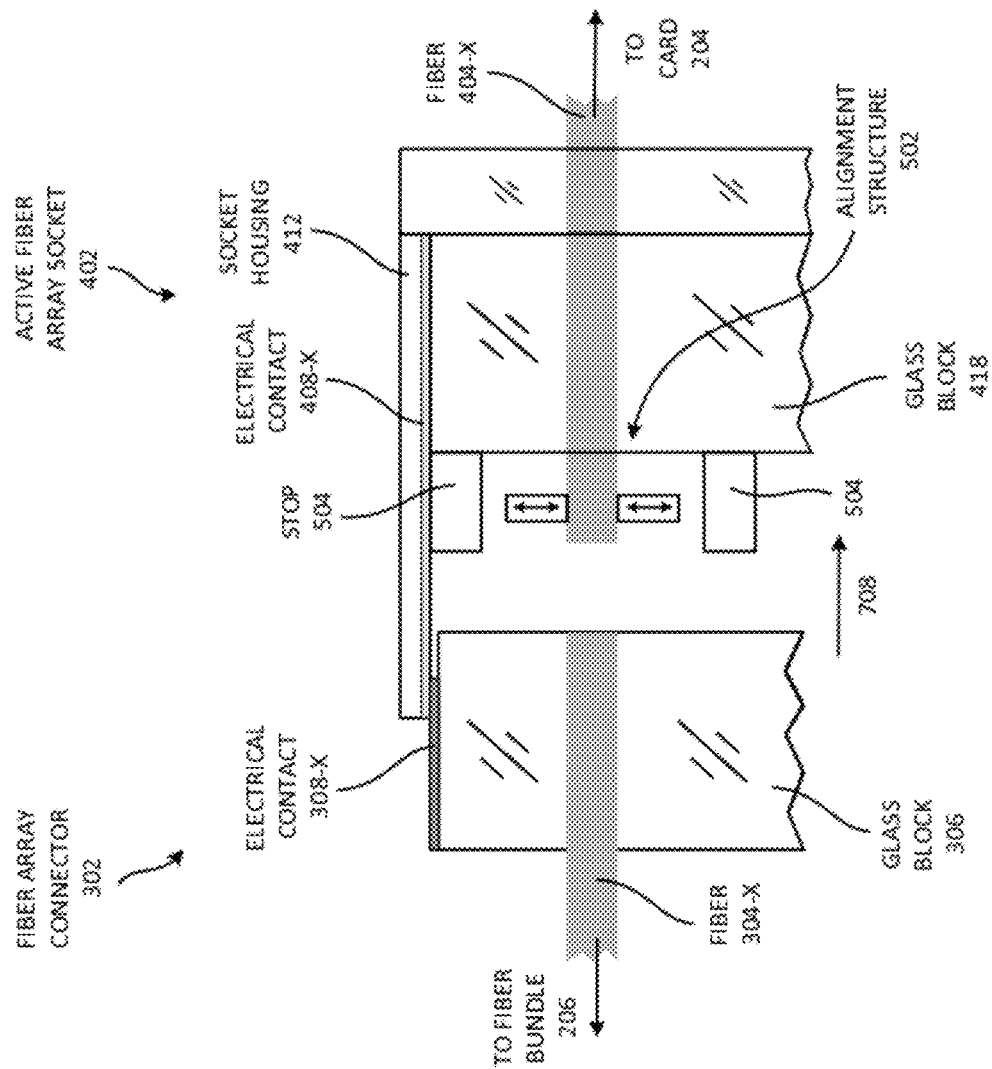
FIGS. 7A and 7B are illustrations of the connector of FIG. 3 being coupled to the socket of FIG. 4 according to one embodiment.
Figure 7B:
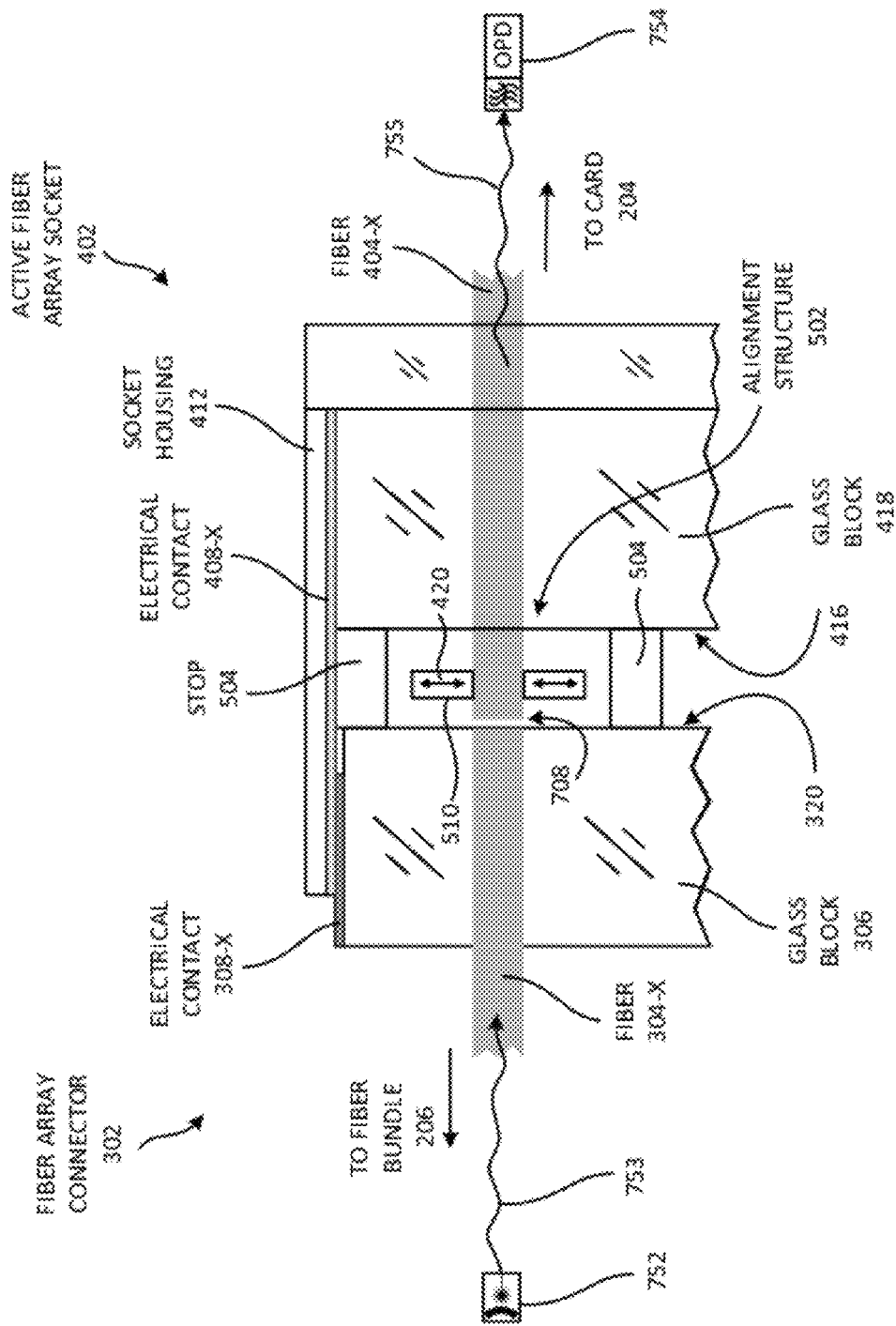

FIGS. 7A and 7B are illustrations of connector 302 being coupled to socket 402 according to one embodiment. More specifically, FIGS. 7A and 7B illustrate a cross section of a portion of connector 302 (e.g., one fiber 304-x and one electrical contact 308-x) coupling to a portion of socket 402 (e.g., one fiber 404-x and one electrical contact 408-x). The portion of connector 302 shown includes fiber 304-x, glass block 306, and electrical contact 308-x. Further, the portion of socket 402 shown includes socket housing 412, electrical contact 408-x, stop 504, alignment structure 410-2, foot 510, and glass block 418.

As shown in FIG. 7A, upon insertion (e.g., in direction 708) of connector 302 into socket 402, socket housing 412 receives glass block 306 and electrical contact 308-x of connector 302. Electrical contact 308-x may come into contact with electrical contact 408-x. As also shown in FIG. 7B, connector 302 may be inserted into housing 412 until glass block 306 rests against stop 504. Housing 412 may act to align fibers 304 (e.g., fiber 304-x) of connector 302 with fibers 404 (e.g., fiber 404-x) of socket 402.

Stop 504 may act to stop the motion of connector 302 into socket 402. For example, connector 302 may move forward in housing 412 until glass block 306 rests on stop 504. In this embodiment, stop 504 may keep a gap 708 between fiber 404-x of socket 402 and fiber 304-x of connector 302. In one embodiment, gap 708 is approximately 5 micrometers. In one embodiment, glass block 306 may be polished with an accuracy of approximately between 1 to 3 micrometers.

Once connector 302 is seated in socket 402 (and perhaps before), electrical communication signals may pass from contact 308-x to corresponding contact 408-x. To the extent that housing 412 does not sufficiently line up fiber 304-x with fiber 404-x for optical communications, alignment structure 502 may align the fibers.

Figure 8A:
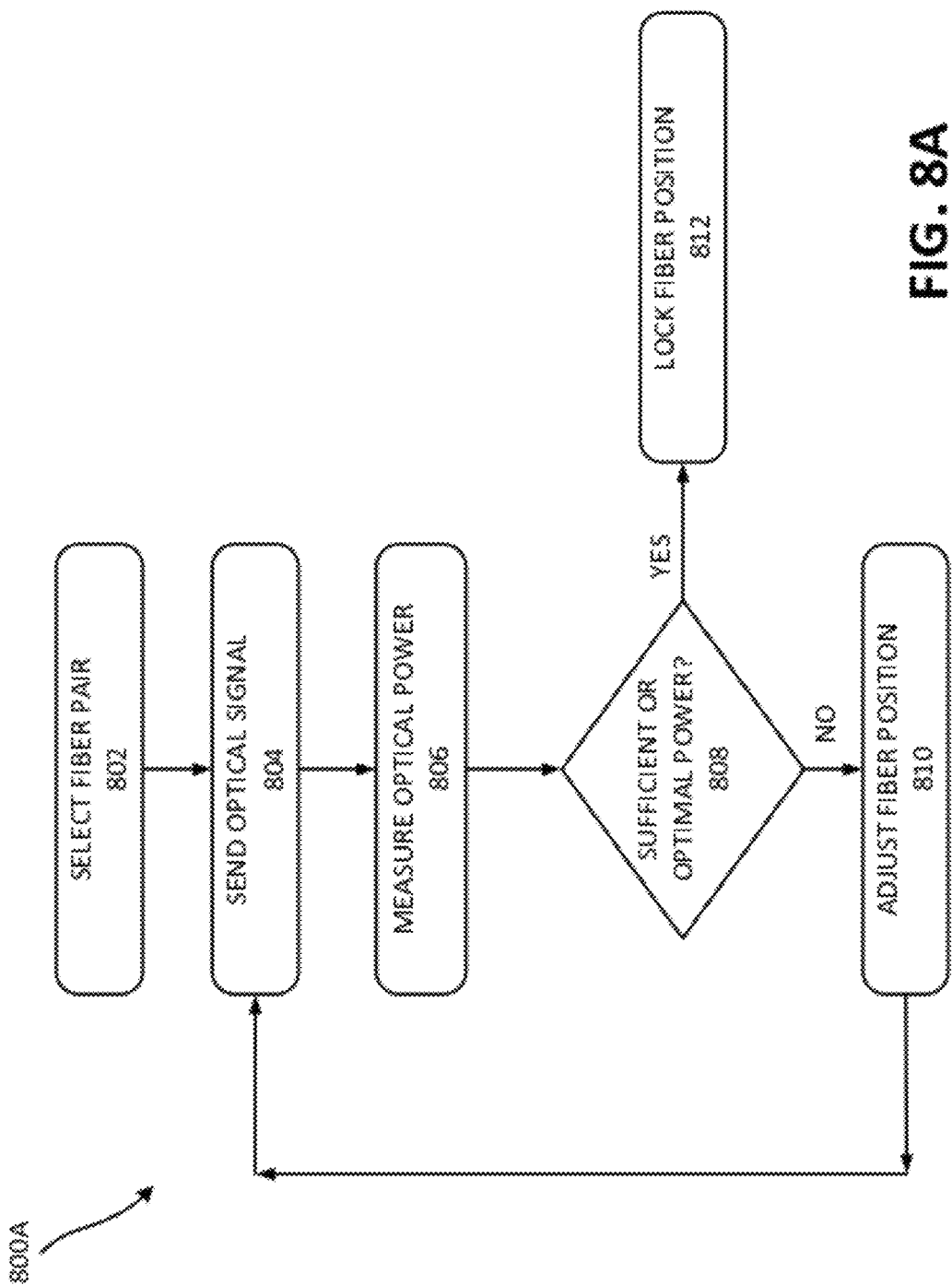

FIG. 8A is a flowchart of an exemplary process 800A for aligning fibers in an active fiber-array socket. Process 800A may begin with the selection of a pair of fibers for adjusting (e.g., aligning) (block 802). For example, fiber 304-x and 404-x may be selected for alignment adjustment. An optical signal may be sent through the fiber pair (block 804). For example, An emitter 752 may emit optical signal 753 through fiber 304-x to be received by fiber 404-x. The optical power of the received signal may be measured (block 806). For example, an optical power detector (OPD) 754 may measure the power of received optical signal 755. If the measured power is insufficient (e.g., insufficient for communications) or not optimal (e.g., given a feedback system) (block 808: YES), then the fiber may be adjusted (block 810) to increase the measured power and blocks 804, 806, and 808 may repeat. Adjusting (or aligning) the fiber may include moving feet 510 of alignment structure 500. As discussed below, adjusting the fiber may also include moving a span in a MEMS structure. If the measured power is sufficient or maximum, then the fiber position may be locked (block 812). Process 800A may be performed on all fiber pairs. Process 800A may also automatically align fiber pairs without user intervention.

FIG. 8B is a flowchart of an exemplary process 800B for aligning fibers in an active fiber-array socket. Process 800B is similar to 800A, but the fiber is not locked (block 812). Rather, if there is sufficient or optimal power (block 808: NO), then process 800B returns to block 804 where an optical signal is sent through the fiber pair. In this embodiment, the adjustment process may be continuous. Further, in this embodiment, optical signals passing into fiber 304-x may include data and optical signals passing from fiber 404-x may be measured to align fiber 304-x. That is, fiber 404-x may be adjusted using power measurements of optical signals carrying data. Process 800B may also automatically align fiber pairs without user intervention.

Sending optical signals (block 804) may also include sending optical signals in the opposite direction, e.g., through fiber 404-x and into fiber 304-x. In this embodiment, the optical power may be measured remotely, e.g., away from alignment structure 502. In this case, the value of the measured optical power may be transmitted to active fiber array socket 402 through, for example, electrical contact 308-*x* and electrical contact 408-*x* (e.g., the electrical-signal portions of cable 103-*x*).

Process 800A and 800B may be performed in response to processing logic executing software instructions stored in a computer-readable medium. A computer-readable medium may include a physical or logical memory device. The memory may include a random access memory (RAM) or another type of dynamic storage device that may store information and instructions; a read-only memory (ROM) device or another type of static storage device that may store static information and instructions for use by the processing logic; and/or some other type of magnetic or optical recording medium and its corresponding drive, e.g., a hard disk drive (HDD), for storing information and/or instructions. The processing logic may include any type of processor or microprocessor (or families of processors or microprocessors) that interprets and executes instructions. In other embodiments, the processing logic may include an application-specific integrated circuit (ASIC), a field-programmable gate array (FPGA), etc.

FIG. 9A is a block diagram of an exemplary fiber array connector 902 in another embodiment. Connector 902 may include fibers 304, glass block 306, electrical contacts 308, and alignment pins 904. Fibers 304, glass block 306, and electrical contacts 308 of connector 902 may be structurally similar and function similarly as those components of connector 302 described above with respect to FIG. 3A. Fiber array connector 208 of FIG. 2 may be arranged as shown in FIG. 9A, but may be scaled so as to include additional fibers (e.g, 3,136 fibers).

Connector 902 may also include alignment pins 904. Alignment pins 904 may extend beyond surface 320 of glass block 306. In the example of FIG. 9A, there are four alignment pins 904. More or fewer alignment pins 904 are possible. For example, there could be hundreds of alignment pins spaced throughout the fiber array and glass block 306.

FIG. 9B is a block diagram of an exemplary active fiber-array socket 952 in another embodiment. Socket 952 may include fibers 404, electrical contacts 408, alignment structures 410, a socket housing 412, and alignment holes 954. Fibers 404, electrical contacts 408, alignment structures 410, and socket housing 412 of socket 952 may be structurally and functionally similar to those components of connector 302 described above with respect to FIG. 4A. Active fiber-array socket 212 of FIG. 2 may be arranged as shown in FIG. 9B, but may be scaled so as to include additional fibers (e.g., 3,136 fibers).

Socket 952 may include alignment holes 954. In one embodiment, alignment holes 954 may extend from surface 416 into glass block 418. In other embodiments, a structure with alignment holes sits in the space otherwise occupied by alignment structures 410 for the corresponding fiber. In the example of FIG. 9B, there are four alignment holes 954. More or fewer alignment holes 954 are possible. For example, there could be hundreds of alignment pins spaced throughout the fiber array and glass block 306. In one embodiment, the number of alignment holes 954 in socket 952 is equal to the number of alignment pins 904 in connector 902. Further, the configuration of alignment holes 954 may be similar or complimentary to the arrangement of alignment pins 904.

Upon insertion of connector 902 into socket 952, alignment pins 904 may be inserted into alignment holes 954. For example, alignment pin 904-*x* may be inserted into alignment hole 954-*x*. In this embodiment, alignment pins 904 and alignment holes may act as one measure to align fibers 304 with the corresponding fibers 404. In addition, as discussed above, housing 412 may also be one measure to align fibers 304 with corresponding fibers 404. To the extent that the above measures do not sufficiently align fibers 304 and 404, alignment structure 410-*x* may act to align the fibers. In one embodiment, the arrangement of alignment pins 904 may be asymmetrical such that connector 902 may be placed in socket 952 in one orientation. In one embodiment, alignment pins 904 may also be used as an electrical contact for communications between connector 902 and socket 952, for example. Pins acting as electrical contacts may, in one embodiment, not necessarily be used for alignment purposes.

Figure 10:
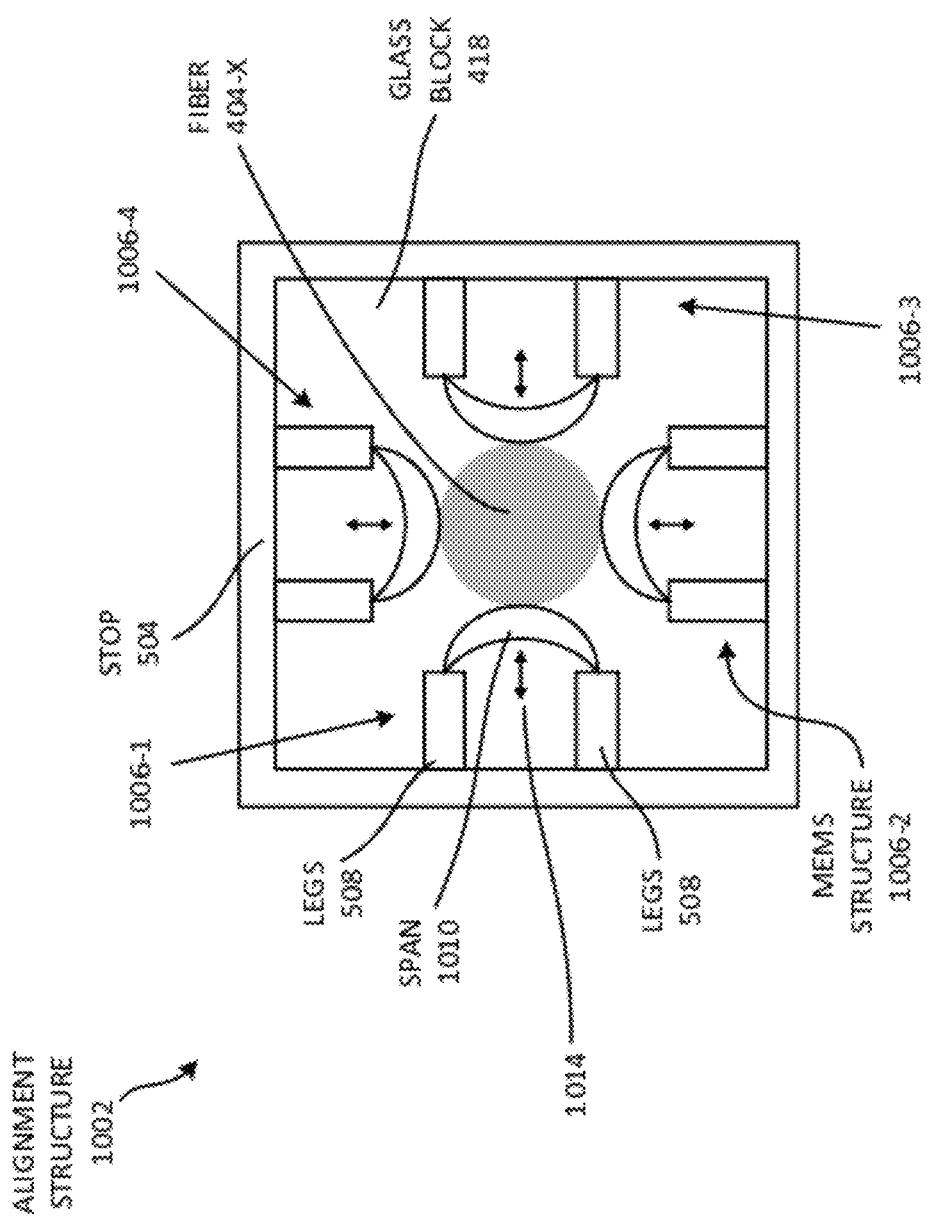
FIG. 10 is a block diagram of an exemplary alignment structure in another embodiment.

FIG. 10 is a block diagram of an exemplary alignment structure 1002 in another embodiment. In one embodiment, alignment structure 410-*x* of FIG. 4 may include alignment structure 1002 shown in FIG. 10. Alignment structure 1002 may include fiber 404-*x*, a glass block 418, a stop 504, and four MEMS (Micro-Electromechanical Systems) structures 906. Fiber 404-*x*, glass block 418, and stop 504 may be structurally and functionally similar to those structures described above with respect to FIGS. 4 and 5.

Fiber 404-*x* may extend above the surface of glass block 418 where it engages a number of MEMS structures 1006 (e.g., four MEMS structures 1006-1 through 1006-4). As with MEMS structures 506, fibers 404-*x* may be movably held by MEMS structures 1006. MEMS structure 1006-1 may include two legs 508 and, rather than a foot, may include a span 1010. MEMS structures 1006-2, 1006-3, and 1006-4 may be structurally and functionally similar. Span 1010 may engage a side of fiber 404-*x*. Together, the spans of MEMS structures 1006 may engage four sides of fiber 404-*x*. A voltage may control span 1010 such that, in one embodiment, span 1010 may move (1) toward or away from the central axis of fiber 404-*x* (e.g., in the directions of double-headed arrow 1014). When connector 302 is coupled to socket 402, alignment structure 1006 may adjust fiber 404-*x* in socket 402 to align with the corresponding fiber 304-*x* in connector 302. In one embodiment, span 1010 may continuously operate and be controlled via a control voltage (e.g., according to process 800A).

As shown in FIG. 1A, connector 302 and socket 402 (e.g., coupler 101) may, for example, be used to connect cards 104 in network devices 102. FIGS. 11 through 14 include exemplary network devices and configurations of network devices that may be used with connector 302 and socket 402, for example.

Figure 11:
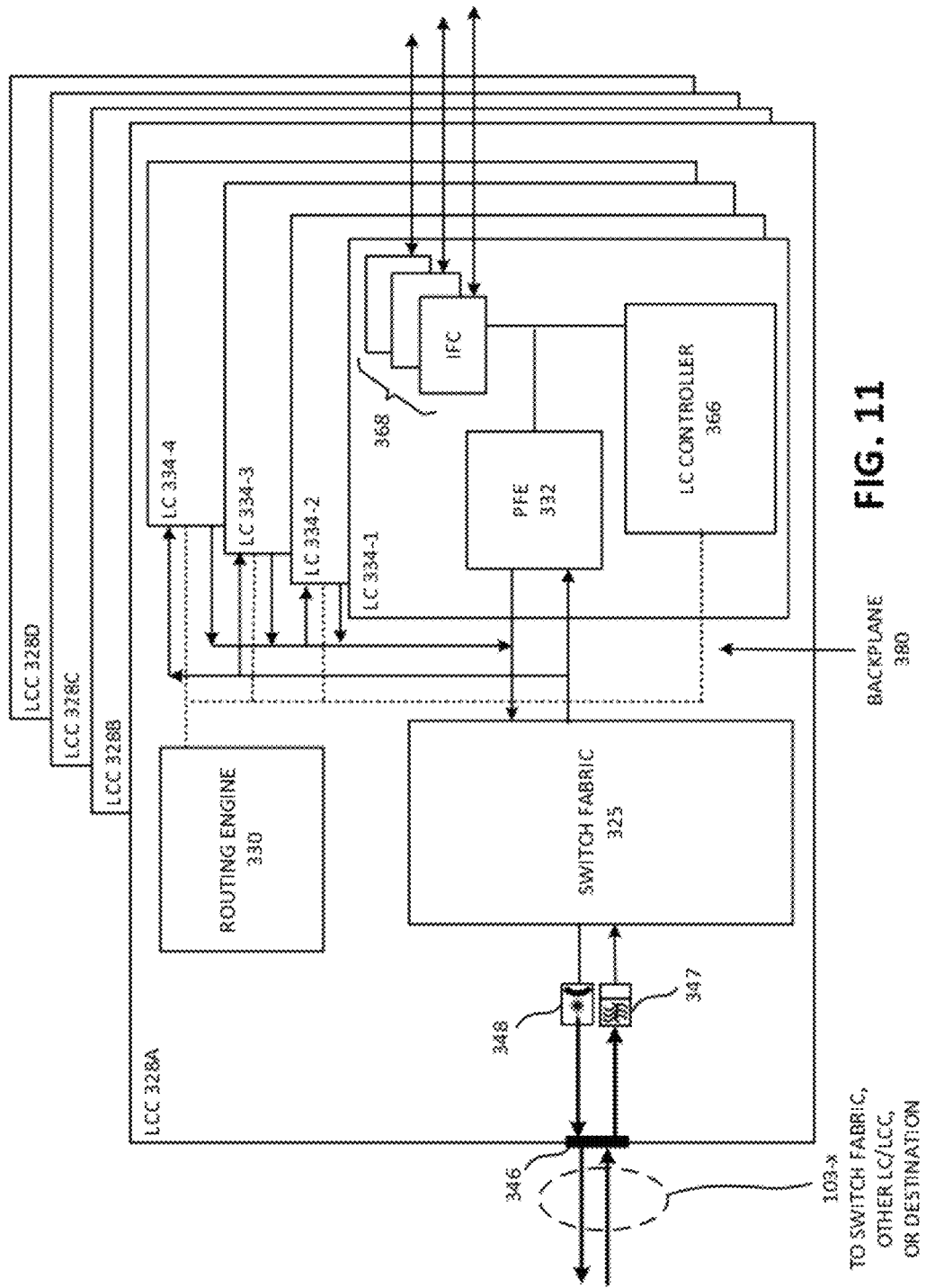
FIGS. 11 through 14 are block diagrams of exemplary network devices using the fiber-optic coupler in one embodiment.

FIG. 11 is a block diagram of exemplary network devices, including line-card chassis (LCC) 328A-328D (collectively, "LCCs 328"). Although LCC 328A is shown in more detail, LCCs 328B-328D may be configured similarly to LCC 328A. In one configuration, LCCs 328 may be coupled together to operate together, e.g., as a single network device. In other configurations, a central routing node may connect LCCs 328 and/or more or fewer LCCs 328 may be present.

LCC 328A may include routing engine 330, switch fabric 325, and four line cards (LCs) 334-1 through 334-4 (collectively, "LCs 334"). Although LC 334-1 is shown in more detail, LCs 334-2 through 334-4 may be configured similarly to LC 334-1. LC 334-1 may include a packet forwarding engine 332, an LC controller 366, and one or more interface cards 368. Interface cards 368 may provide physical interfaces for receiving and sending packets to an external node. LC controller 366 may perform control functions within an LC 334 according to instructions from routing engine 330.

When one of IFCs 368 receives an incoming data packet, IFC 368 forwards the incoming data packet to PFE 332. PFE 332 determines if the incoming data packet has a destination that requires the data packet to be forwarded to one of IFCs 368 of LC 334-1 or a destination that requires the data packet to be forwarded an IFC other than one of IFCs 368 according to an FIB (forward information base) provided by routing engine 330. If the incoming data packet is to be output by one of IFCs 368 of LC 334-1, PFE 332 forwards the data packet to the appropriate one of IFCs 368. If not, PFE 332 may forward the data packet to switch fabric 325 for relaying to a different LC 334 and/or a different LCC 328.

LCC 328A may also include a backplane 380. Backplane 380 provides for electrical paths (e.g., traces) and connections between LCs 334 and LCC 328A. Data packets flow through the electrical connections from LCs 334 to LCC 328 so that switch fabric 325 may forward them to their destination. Data rates may be high, however, and the electrical paths and connections at a high data rate may cause electrical interference, thus limiting the throughput of data from one LC 334 to another LC 334. Higher data rates cause further increase electrical interference. To reduce the data rate, the data may be "de-serialized" or "parallelized." For example, an 8-bit wide data path can transmit the same amount of data as a 1-bit wide data path but at 1/8 th the rate. This solution, however, may require additional power (which may also generate additional heat) to de-serialize the data at a point between IFC 368 and switch fabric 325, and then to re-serialize the data before the data reaches the next IFC, for example. In addition, backplane 380 may have limited space for additional electrical pins.

In one embodiment, LCC 328A may include an arrayed-fiber coupling 346 (e.g., connector 302/socket 402 or connector 902/socket 952) for interconnecting switch fabric 325 with other switch fabrics, equipment cards, or network devices. LCC 328A may include a number of optical-to-electrical converters (OECs) 347 to convert optical signals received through coupling 346 into the electrical domain for switch fabric 325. LCC 328 may also include a number of electrical-to-optical converters (EOCs) 348 to convert electrical signals into optical signals for coupling 346. Coupling 346 may allow switch fabric 325 to send and/or receive optical signals through many (e.g., dozens, hundreds, or thousands) of optical fibers.

Figure 12:
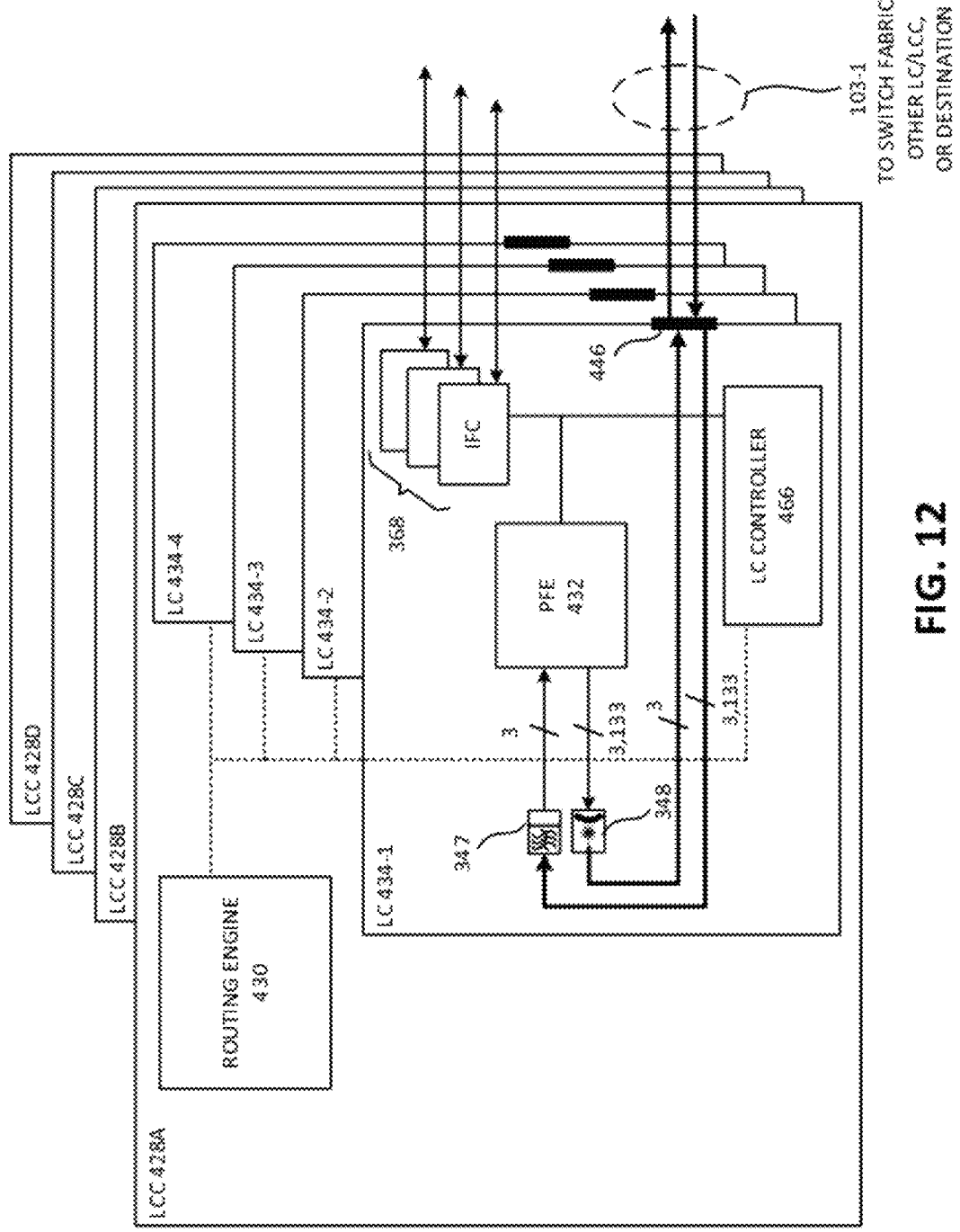

FIG. 12 is a block diagram of exemplary network devices, including line-card chassis (LCC) 428A-428D (collectively, "LCCs 428"). Although LCC 428A is shown in more detail, LCCs 428B-428D may be configured similarly to LCC 428A. In one configuration, LCCs 428 may be coupled to operate together, e.g., as a single network device. In other configurations, a central routing node may connect LCCs 428.

LCC 428A may include routing engine 430 and four line cards (LCs) 434-1 through 434-4 (collectively, "LCs 434"). Although LC 434-1 is shown in more detail, LCs 434-2 through 434-4 may be configured similarly to LC 434-1. Line card 434-1 may include a packet forwarding engine 432, an LC controller 466, and one or more interface cards 368. Similar to the description above with respect to FIG. 11, interface cards 368 may provide physical interfaces for receiving and sending packets to an external node. LC controller 466 may perform control functions within an LC 434 according to instructions from routing engine 430.

When one of IFCs 368 receives an incoming data packet, IFC 368 forwards the incoming data packet to PFE 432. PFE 432 may determine if the incoming data packet has a destination that requires the data packet to be forwarded to one of IFCs 368 of LC 434-1 or a destination that requires the data packet to be forwarded an IFC other than one of IFCs 368 of LC 434-1 (e.g., according to an FIB provided by routing engine 430). If the incoming data packet is to be output by one of IFCs 368 of LC 434-1, PFE 432 may forward the data packet to the appropriate one of IFCs 368. If not, PFE 432 may forward the data packet through an interface (e.g., an optical interface 446) to a switch fabric (not shown), another LC, another LCC, or to the packet's destination.

In one embodiment, interface 446 may include the arrayed-fiber optical coupling (e.g., connector 302/socket 402 or connector 902/socket 952) described above. LC 434-1 may include a number of OECs 347 to convert optical signals received through coupling 446 into electrical signals for PFE 432. LC 434-1 may also include a number of EOCs 348 to convert electrical signals into optical signals for coupling 446. Coupling 446 may allow PFE 432 to send and/or receive optical signals through many (e.g., dozens, hundreds, or thousands) of optical fibers.

In the embodiment of FIG. 12, the traces and pins associated with moving data to/from PFE 432 from/to a switch fabric in LCC 428A (e.g., part of the backplane connection) may be eliminated or reduced in size/number. Instead, data moving to/from PFE 432 may reach a switch fabric through interface 446. The remaining backplane connections may be used for power and control (e.g., for routing engine 430). Further, this embodiment may allow for less de-serialization and serialization of data, higher data rates, and less interference. This embodiment may also save power and lower the temperature of LC 434-1.

Figure 13:
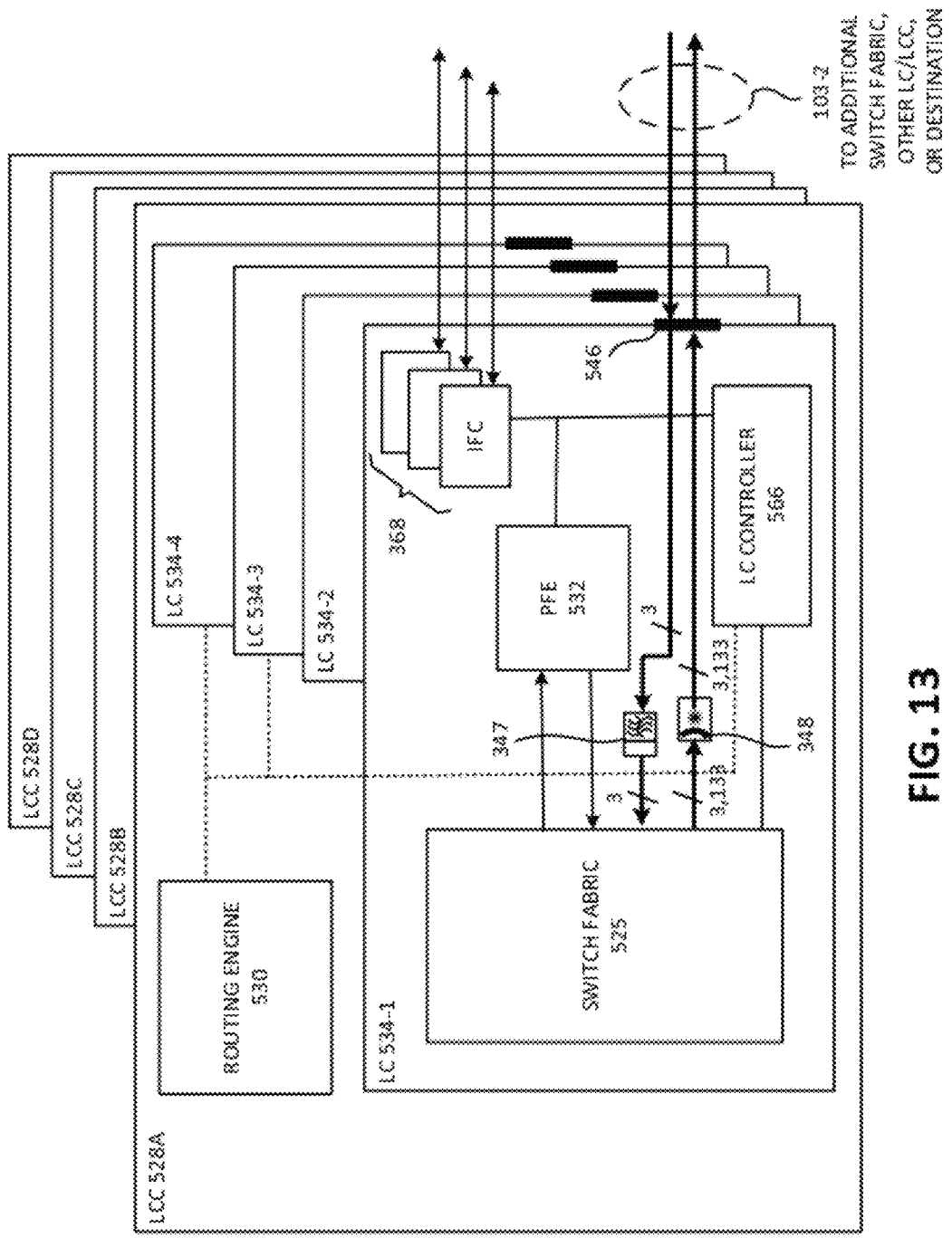

FIG. 13 is a block diagram of exemplary network devices, including line-card chassis (LCC) 528A-528D (collectively, "LCCs 528"). Although LCC 528A is shown in more detail, LCCs 528B-528D may be configured similarly to LCC 528A. In one configuration, LCCs 528 may be coupled to operate together, e.g., as a single network device. In other configurations, a central routing node may connect LCCs 528 and/or more or fewer LCCs 528 may be present.

LCC 528A may include routing engine 530 and four line cards (LCs) 534-1 through 534-4 (collectively, "LCs 534"). Although LC 534-1 is shown in more detail, LCs 534-2 through 534-4 may be configured similarly to LC 534-1. Line card 534-1 may include a packet forwarding engine 532, an LC controller 566, and one or more interface cards 368. LC controller 566 may perform control functions within an LC 534-1 according to instructions from routing engine 530.

When one of IFCs 368 receives an incoming data packet, IFC 368 forwards the incoming data packet to PFE 532. PFE 532 may determine if the incoming data packet has a destination that requires the data packet to be forwarded to one of IFCs 368 of LC 534-1 or a destination that requires the data packet to be forwarded to an IFC other than one of IFCs 368 of LC 534-1 (e.g., according to an FIB provided by routing engine 530). If the incoming data packet is to be output by one of IFCs 368 of LC 534-1, PFE 532 may forward the data packet to the appropriate one of IFCs 368. If not, PFE 532 may forward the data packet to switch fabric 525. Switch fabric 525 may forward the data packet through an interface 546 (e.g., an optical interface) to additional switch fabric (not shown), another LC, another LCC, or to the packet's destination.

In one embodiment, interface 456 may include the arrayed-fiber optical coupling (e.g., connector 302/socket 402 or connector 902/socket 952) described above. LC 534-1 may include a number of OECs 347 to convert optical signals received through coupling 546 into electrical signals for switch fabric 525. LC 534-1 may also include a number of EOCs 348 to convert electrical signals into optical signals for coupling 546. Coupling 546 may allow switch fabric 525 to send and/or receive optical signals through many (e.g., dozens, hundreds, or thousands) of optical fibers.

In the embodiment of FIG. 13, the traces and pins associated with moving data to/from PFE 532 from/to switch fabric 523 in LCC 528A (e.g., part of the backplane connection) may be eliminated or reduced in size/number. Instead, data moving to/from PFE 532 may reach switch fabric 532 on the same LC 534-1 and may pass to additional switch fabric, for example, through interface 546. The remaining backplane connections may be used for power and control (e.g., for routing engine 530). Further, this embodiment may allow for less de-serialization and serialization of data, higher data rates, and less interference. This embodiment may also save power and lower the temperature of LC 534-1.

Figure 14:
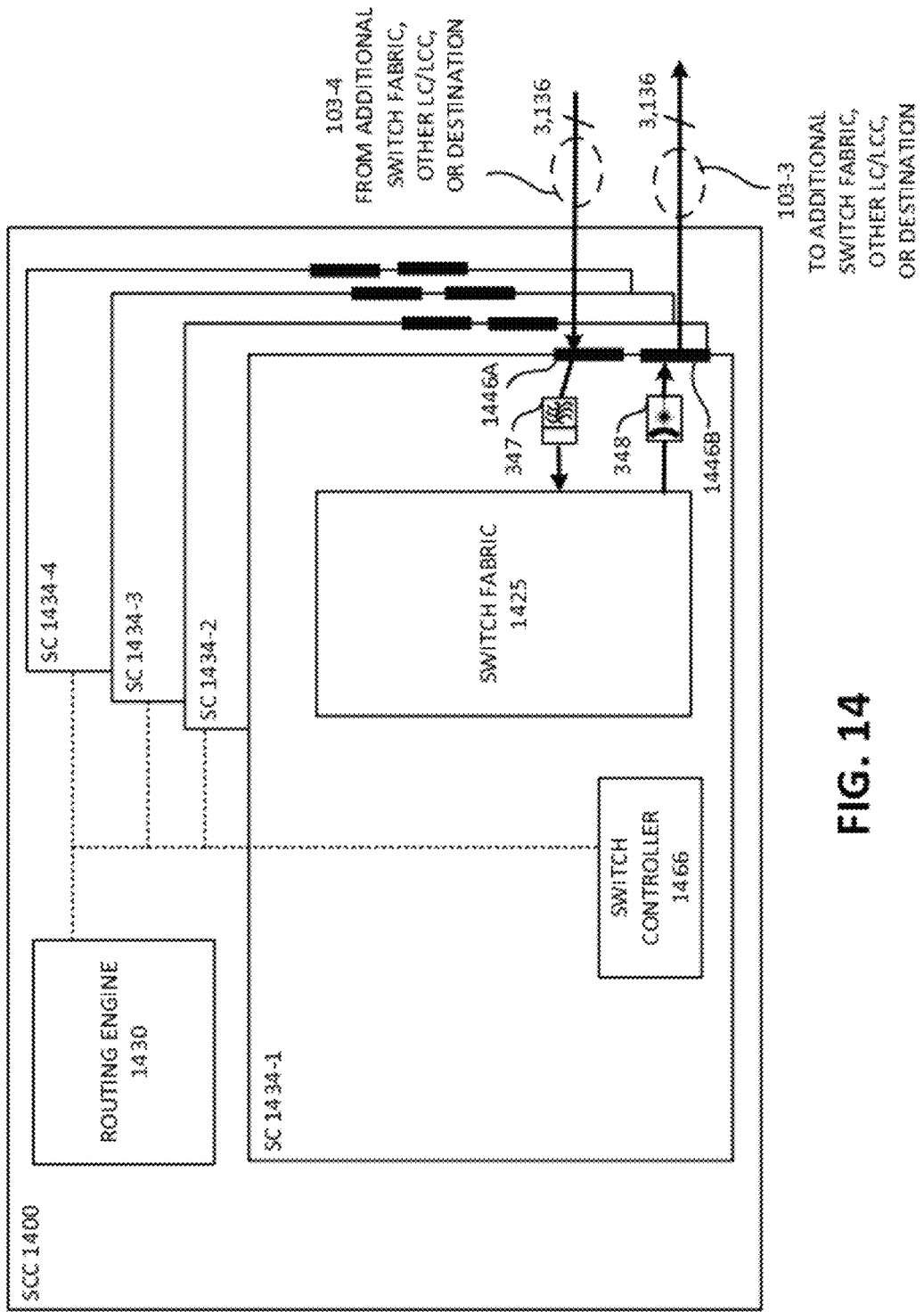

FIG. 14 is a block diagram of an exemplary switch-card chassis (SCC) 1400. SCC 1400 may include routing engine 1430 and four switch cards 1434-1 through 1434-4 (collectively, "SCs 1534"). Although SC 1434-1 is shown in more detail, SCs 1434-2 through 1434-4 may be configured similarly to SC 1434-1. SC 1434-1 may include a switch fabric 1425, a switch controller, and two interfaces 1446A and 1446B. SC controller 1466 may perform control functions within SC 1434-1 according to instructions from routing engine 1430.

When SC 1434-1 receives an incoming data packet through interface 1446A, switch fabric 1425 determines the destination. Switch fabric 1425 then sends the packet out through port 1446B (e.g., according to an FIB provided by routing engine 1430). Switch fabric 1425 may forward the data packet through an interface 1446A or 1446B (e.g., an arrayed-fiber optical coupling) to additional switch fabric (not shown), another SC, another SCC, or to the packet's destination.

In one embodiment, interfaces 1456A and 1456B may each include the arrayed-fiber optical coupling (e.g., connector 302/socket 402 or connector 902/socket 952) described above. SC 1434-1 may include a number of OECs 347 to convert optical signals received through coupling 1446A into electrical signals for switch fabric 1425. SC 1434-1 may also include a number of EOCs 348 to convert electrical signals into optical signals for coupling 1446B. Coupling 1446A and 1446B may allow switch fabric 1425 to send and/or receive optical signals through many (e.g., dozens, hundreds, or thousands) of optical fibers.

In the embodiment of FIG. 14, the traces and pins associated with moving data to/from SC 1434-1 to SCC 1400 (e.g., part of the backplane connection) may be eliminated or reduced in size/number. Instead, data moving to/from switch fabric 1425 may reach other SCs, SCCs, or network devices through interfaces 1446A and 1446B. The remaining backplane connections may be used for power and control (e.g., for routing engine 1430). Further, this embodiment may allow for less de-serialization and serialization of data, higher data rates, and less interference. This embodiment may also save power and lower the temperature of SC 1434-1.

In the network devices of FIGS. 11, 12, 13, and 14, an optical cable 103-*x* and arrayed-fiber optical couplings (e.g., connector 302/socket 402), as disclosed herein, are used. In these cases, network topology information and routing information may be distributed throughout the network as electrical signals in the electrical paths of cable 103-*x* (e.g., through electrical contacts 308 and 408).

Figure 15:
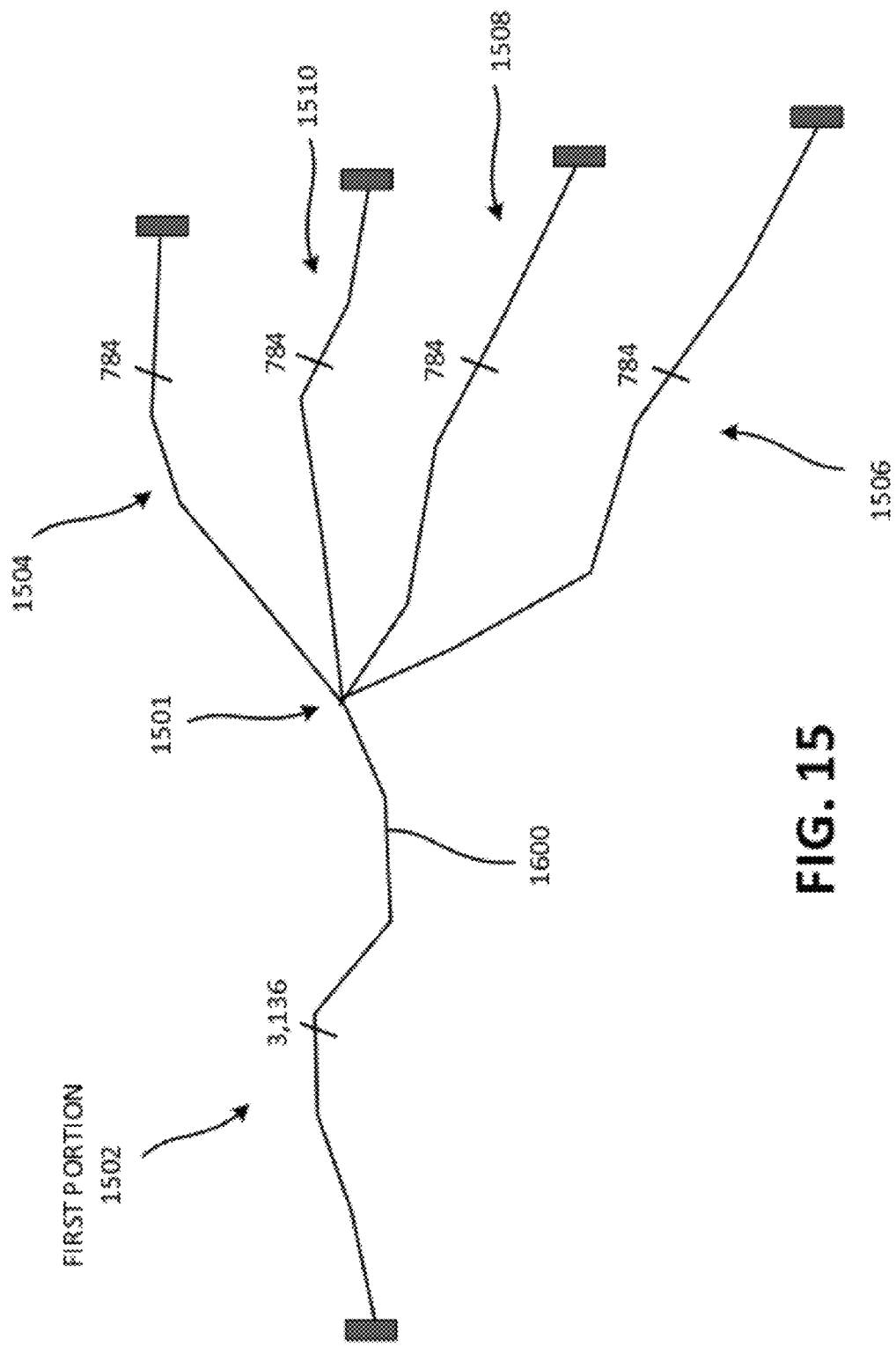
FIG. 15 is an illustration of an exemplary fiber optic cable according to one embodiment.

FIG. 15 is an illustration of an exemplary fiber optic cable 1500 according to one embodiment. Cable 1500 includes a first portion 1502 with 3,136 optical fibers. First portion splits into four portions (e.g., portions 1506 through 1510) at point 1501, each with 784 optical fibers, for example. In this embodiment, one network device may be coupled to first portion 1502 and four separate network devices may be coupled to portions 1504, 1506, 1508, and 1510, respectively. Any number of splits is possible. Further any number of fibers in each of the portions is also possible.

Figure 16:
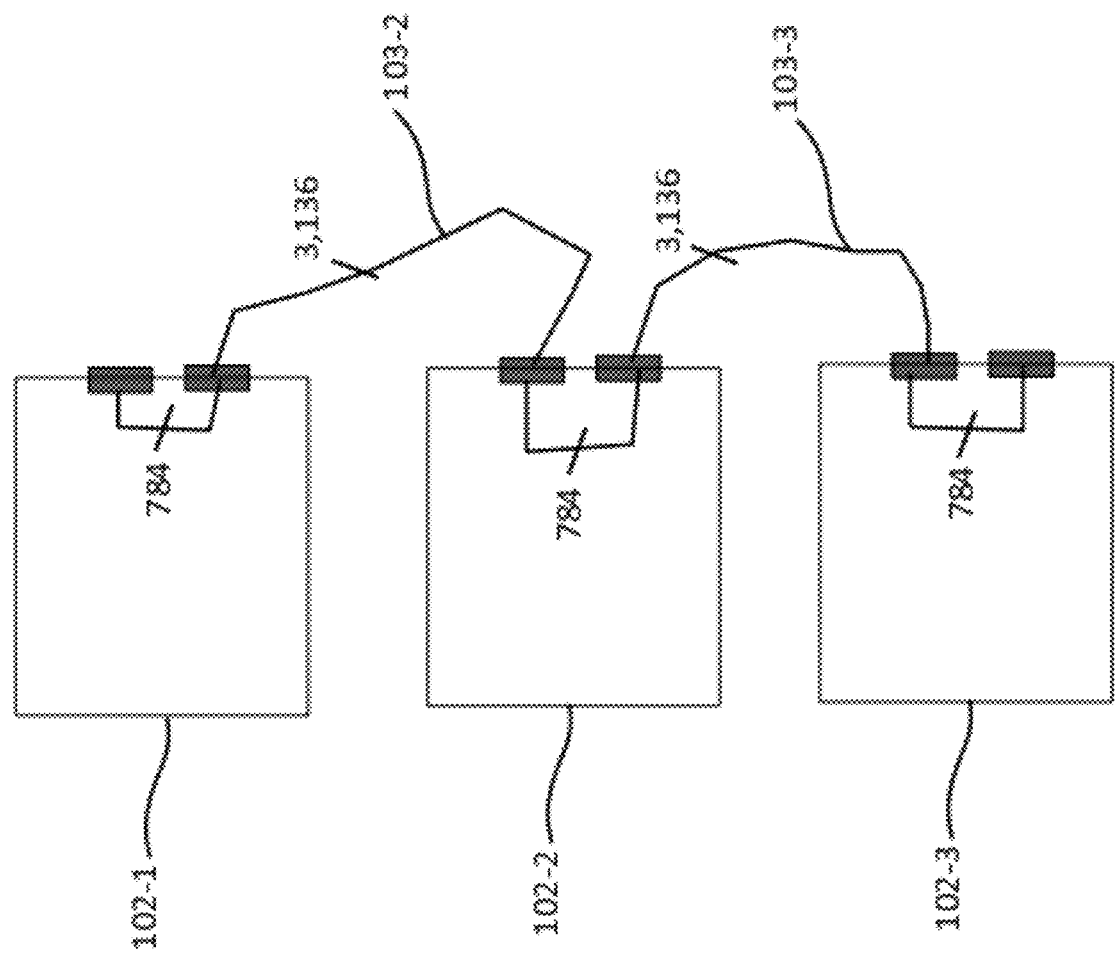
FIGS. 16 and 17 are block diagrams of exemplary configurations of network devices in embodiments described herein.

FIG. 16 is an illustration of an exemplary configuration of network devices 102 in one embodiment. As shown in FIG. 16, network device 102-1 is coupled to network device 102-2 with cable 103-2, which includes 3,136 optical fibers. Of these fibers, 784 are passed from input to output. Further, network device 102-2 is coupled to network device 102-3 with cable 103-3, which includes 3,136 fibers. In this embodiment, 784 of the 3,136 fibers going between network device 102-2 and 102-3 are passed through network device 102-2 from network device 102-1.

Figure 17:
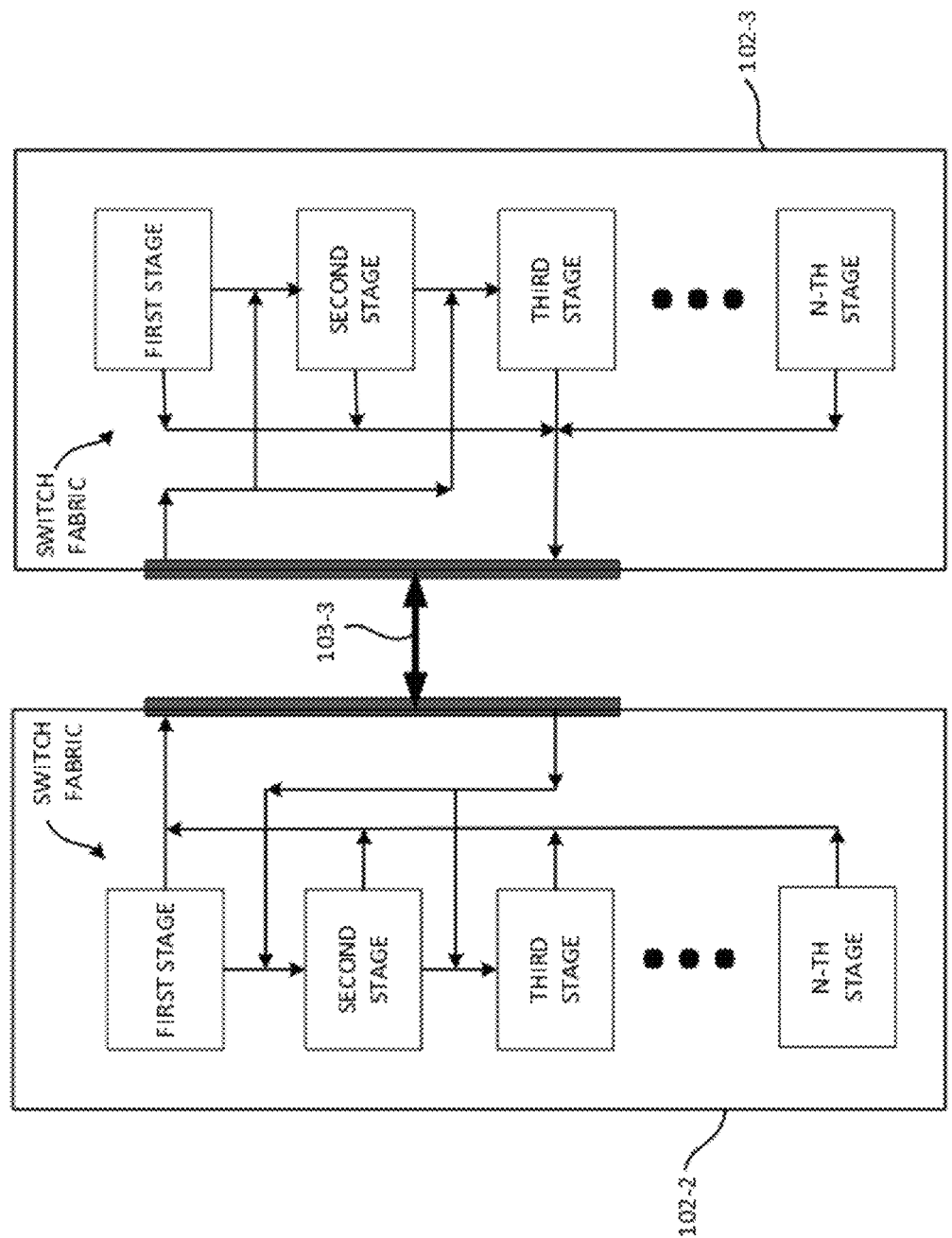

FIG. 17 is an illustration of an exemplary configuration of network devices in one embodiment. Network device 102-2 includes a switch fabric having N stages. Network device 102-3 also includes a switch fabric having N stages. In this embodiment, first stage of network device 102-2 may pass data to second stage of network device 102-3, vice versa, and so on through the Nth stage. Active fiber-array coupler may enhance the connection between the switch fabric of network devices 102-2 and 102-3.

In the description above, fiber array socket 212 received fiber array connector 208. The terms "socket" and "connector" may be used interchangeably. Thus, a socket may be considered a connector. Further, referring to FIG. 2, socket 212 is "active" in that socket 212 actively adjusts fibers. In one embodiment, connector 208 may alternatively or also be active in that connector 208 may actively adjust fibers. In the description above, fiber array socket 212 and connector 208 included a square array of optical fibers. Other shapes and array patterns are possible, such as circular with hexagonal shapes for alignment structures.

While series of blocks have been described above with respect to different processes, the order of the blocks may differ in other implementations. Moreover, non-dependent acts may be performed in parallel.

It will be apparent that aspects of the embodiments, as described above, may be implemented in many different forms of software, firmware, and hardware in the embodiments illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

Further, certain portions of the invention may be implemented as logic that performs one or more functions. This logic may include hardware, such as an application specific integrated circuit, a field programmable gate array, a processor, or a microprocessor, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the articles "a" and the term "one of" are intended to include one or more items. Further, the phrase "based on" is intended to mean "based, at least in part, on" unless explicitly stated otherwise.

What is claimed is:

1. A fiber-optic coupler comprising:
a socket including:
a first optical fiber including an end portion to send or receive optical signals to or from an end portion of a second optical fiber;
a micro-electromechanical systems (MEMS) structure to align the end portion of the first optical fiber with the end portion of the second optical fiber; and
a housing to receive a connector, wherein the second optical fiber is fixed to the connector, wherein the housing is configured to align the end portion of the first optical fiber with the end portion of the second optical fiber as the connector is moved into the housing of the socket.

2. The fiber-optic coupler of claim 1,
wherein the MEMS structure aligns the end portion of the first optical fiber based on optical power sent or received from the first optical fiber to or from the second optical fiber,
wherein the socket includes a stop to prevent further movement of the connector into the socket forming a gap between the end portion of the first optical fiber and the end portion of the second optical fiber.

3. The fiber-optic coupler of claim 2, wherein the socket includes:
a first glass block, wherein the end portion of the first optical fiber is supported by the first glass block, wherein the end portion of the first optical fiber extends out from a first surface of the first glass block, wherein the MEMS structure engages the portion of the first optical fiber that extends beyond the surface of the first glass block.

4. The fiber-optic coupler of claim 3, wherein the gap is approximately 5 micrometers.

5. The fiber-optic coupler of claim 3, further comprising:
a first electrical contact mounted on a second surface of the first glass block, wherein the second surface of the first glass block is orthogonal to the first surface of the first glass block.

6. The fiber-optic coupler of claim 3, further comprising:
the connector including:
the second optical fiber; and
a second glass block for mounting the end portion of the second optical fiber wherein the end portion of the second optical fiber extends out from a first surface of the second glass block.

7. The fiber-optic coupler of claim 6, wherein an end of the second optical fiber is flush with a surface of the second glass block.

8. The fiber-optic coupler of claim 6, wherein the connector further comprises a second electrical contact mounted on a second surface of the second glass block orthogonal to the first surface of the second glass block, wherein the second electrical contact comes into contact with the first electrical contact when the connector is moved into the housing of the socket.

9. The fiber-optic coupler of claim 3, wherein the socket further comprises:
a first plurality optical fibers, each including an end portion to send or receive optical signals to or from an end portion of a second plurality of optical fibers included in the connector, wherein the second plurality of optical fibers move in tandem with the connector, wherein the first plurality of optical fibers includes the first optical fiber and the second plurality of fibers includes the second optical fiber; and
a second plurality of micro-electromechanical systems (MEMS) structures to align the corresponding end portions of the first plurality of optical fibers with the corresponding end portions of the second plurality of optical fibers,
wherein the housing is configured to align the end portions of the first plurality of optical fibers with the corresponding end portions of the second plurality of optical fibers as the connector is moved into the housing of the socket, and
wherein the first glass block supports the end portions of the first plurality of optical fibers.

10. A fiber-optic coupler comprising:
a connector including:
a first plurality of optical fibers, each including an end portion to send or receive optical signals to or from a corresponding end portion of one of a second plurality of optical fibers included in a socket, wherein a plurality of micro-electromechanical systems (MEMS) structures align the end portions of the second plurality of optical fibers with the end portions of the first plurality of optical fibers; and
a first glass block for mounting the end portions of the first plurality of optical fibers, wherein the first glass block secures the first plurality of optical fibers such that the first plurality of optical fibers move in tandem as the connector is inserted into the socket.

11. The fiber-optic coupler of claim 10, wherein ends of the first plurality of optical fibers are flush with a first surface of the first glass block.

12. The fiber-optic coupler of claim 11, wherein the connector further comprises:
an electrical contact surface-mounted on the second glass block.

13. The fiber-optic coupler of claim 10, further comprising:
the socket including:
the second plurality of optical fibers; and
the plurality of micro-electromechanical systems (MEMS) structures to align the end portions of the second plurality of optical fibers with the end portions of the first plurality of optical fibers.

14. The fiber-optic coupler of claim 13, wherein the socket includes a second glass block, and wherein the end portions of the second plurality of optical fibers are supported by the second glass block.

15. The fiber-optic coupler of claim 14, wherein the end portions of the second plurality of optical fibers extend beyond a surface of the first glass block, wherein the plurality of MEMS structures engage the portions of the second plurality of optical fibers that extend beyond the surface of the second glass block, wherein at least one of the plurality of MEMS structures includes a plurality of legs to support a member for aligning at least one of the second plurality of optical fibers.

16. The fiber-optic coupler of claim 14, wherein the socket further comprises:
an electrical contact surface-mounted on the second glass block;
a housing to receive the connector including the second optical fiber, wherein the housing is configured to align the end portions of the first plurality of optical fibers with the corresponding end portions of the second plurality of optical fibers as the connector is moved into the housing of the socket; and a stop to prevent further movement of the connector into the socket forming a gap between the end portions of the first plurality of optical fibers and the end portions of the second plurality of optical fibers.

17. The fiber-optic coupler of claim 10, wherein the plurality of MEMS structures align the end portions of the second plurality of optical fibers based on optical power sent or received from the first plurality of optical fibers to or from the second plurality of optical fibers.

18. A method comprising:
transmitting optical signals from an end portion of a first optical fiber to an end portion of a second optical fiber, wherein the first optical fiber is attached to a socket and the second optical fiber is attached to a connector, wherein the connector and the socket move relative to each other such that the socket receives the connector;
measuring a value indicative of the optical power passing from the first optical fiber to the second optical fiber; and
aligning the end portion of the first optical fiber or the second optical fiber, using a micro-electromechanical systems (MEMS) structure, based on the measured value indicative of the optical power passing from the first optical fiber to the second optical fiber.

19. The method of claim 18, wherein the end portion of the first optical fiber is supported by a first glass block and the end portion of the second optical fiber is supported by a second glass block.

20. The method of claim 19, wherein the MEMS structure engages a portion of the first optical fiber or the second optical fiber that extends beyond a surface of the first or second glass block.

21. The method of claim 20, wherein the end of the first optical fiber or the second optical fiber is flush with a surface of the second glass block.

22. The method claim 18, further comprising:
aligning end portions of a first plurality of optical fibers or a second plurality of optical fibers, using a micro-electromechanical systems (MEMS) structure,
wherein the first plurality of optical fibers are fixed in the socket and the second plurality of optical fibers are fixed in the connector, and
wherein each of the first plurality of optical fibers are aligned with a corresponding one of the second plurality of optical fibers as the connector is moved into a housing of the socket.

23. A system comprising:
a first equipment card for inserting into an equipment chassis,
wherein the first equipment card includes a first socket to receive a first connector, wherein the first connector is attached to a cable including a first plurality of optical fibers, wherein the first socket includes a housing and a second plurality of optical fibers, wherein first ends of the first plurality of optical fibers are optically coupled to second ends of the second plurality of optical fibers when the first connector is inserted into the first socket, and
wherein a first plurality of micro-electromechanical systems (MEMS) structures are configured to align the first ends of the first plurality of optical fibers or the second ends of the second plurality of optical fibers to optically couple the first plurality of optical fibers with the second plurality of optical fibers, and
wherein the housing of the first connector is configured to align the first ends of the first plurality of optical fibers with the second ends of the second plurality of optical fibers as the first connector is inserted into the first socket.

24. The system of claim 23, further comprising:
a second equipment card for inserting into the equipment chassis,
wherein the second equipment card includes a second socket to receive a second connector, wherein the second connector is attached to the cable including the first plurality of optical fibers, wherein the second socket includes a housing and a third plurality of optical fibers, wherein third ends of the first plurality of optical fibers are optically coupled to fourth ends of the third plurality of optical fibers when the second connector is inserted into the second socket, and
wherein a second plurality of MEMS structures are configured to align the third ends of the first plurality of optical fibers or the fourth ends of the third plurality of optical fibers to optically couple the first plurality of optical fibers with the third plurality of optical fibers.

25. The system of claim 24, further comprising:
the first connector;
the second connector;
the cable; and
the equipment chassis, wherein the first equipment card includes the first plurality of MEMS structures and the second equipment card includes the second plurality of MEMS structures.

* * * * *